(12) United States Patent
Kondo et al.

(10) Patent No.: US 10,661,166 B2
(45) Date of Patent: May 26, 2020

(54) INFORMATION PROCESSING SYSTEM, INFORMATION PROCESSING METHOD, INFORMATION PROCESSING APPARATUS, AND NON-TRANSITORY STORAGE MEDIUM ENCODED WITH COMPUTER READABLE INFORMATION PROCESSING PROGRAM

(71) Applicant: NINTENDO CO., LTD., Kyoto-shi, Kyoto (JP)

(72) Inventors: Yoshihisa Kondo, Kyoto (JP); Yuki Mizuguchi, Kyoto (JP); Masayoshi Oki, Kyoto (JP); Pacôme Danhiez, Paris (FR); Romain Bailly, Paris (FR); Yann Benigot, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 357 days.

(21) Appl. No.: 15/280,197

(22) Filed: Sep. 29, 2016

(65) Prior Publication Data
US 2017/0095735 A1    Apr. 6, 2017

(30) Foreign Application Priority Data

Oct. 1, 2015    (JP) .................................. 2015-195881

(51) Int. Cl.
*A63F 13/86*    (2014.01)
*A63F 13/32*    (2014.01)
(Continued)

(52) U.S. Cl.
CPC .............. *A63F 13/32* (2014.09); *A63F 13/24* (2014.09); *A63F 13/25* (2014.09); *A63F 13/26* (2014.09);
(Continued)

(58) Field of Classification Search
CPC .......... A63F 13/25; A63F 13/26; A63F 13/32; A63F 13/34
See application file for complete search history.

(56) References Cited

U.S. PATENT DOCUMENTS

| | | | |
|---|---|---|---|
| 2002/0169013 A1* | 11/2002 | Serizawa | A63F 13/005 463/6 |
| 2003/0038805 A1* | 2/2003 | Wong | A63F 13/12 345/473 |

(Continued)

FOREIGN PATENT DOCUMENTS

| | | |
|---|---|---|
| JP | 6-327835 | 11/1994 |
| JP | 2005-223413 | 8/2005 |

(Continued)

*Primary Examiner* — James S. McClellan
*Assistant Examiner* — Kevin M Carter
(74) *Attorney, Agent, or Firm* — Nixon & Vanderhye P.C.

(57) ABSTRACT

Each of a first information processing apparatus and a second information processing apparatus includes a display, an operation portion, and a radio communication unit. The second apparatus transmits operation information accepted by the operation portion of the second apparatus to the first apparatus through the radio communication unit. The first apparatus performs application processing based on operation information accepted by the operation portion of the first apparatus and the operation information from the second apparatus, generates an application image including a result of execution of the application processing, shows the application image on the display of the first apparatus, and transmits the application image to the second apparatus through the radio communication unit of the first apparatus. The second apparatus shows the application image from the first apparatus on the display of the second apparatus.

27 Claims, 17 Drawing Sheets

(51) Int. Cl.

| | | |
|---|---|---|
| *H04W 4/80* | (2018.01) | |
| *A63F 13/26* | (2014.01) | |
| *A63F 13/34* | (2014.01) | |
| *A63F 13/92* | (2014.01) | |
| *H04W 4/00* | (2018.01) | |
| *A63F 13/355* | (2014.01) | |
| *A63F 13/24* | (2014.01) | |
| *A63F 13/25* | (2014.01) | |
| *A63F 13/803* | (2014.01) | |
| *A63F 13/87* | (2014.01) | |
| *H04W 4/12* | (2009.01) | |
| *H04W 4/02* | (2018.01) | |
| *H04W 4/06* | (2009.01) | |
| *H04L 12/931* | (2013.01) | |
| *H04L 12/70* | (2013.01) | |

(52) U.S. Cl.
CPC ............ *A63F 13/34* (2014.09); *A63F 13/355* (2014.09); *A63F 13/803* (2014.09); *A63F 13/86* (2014.09); *A63F 13/87* (2014.09); *A63F 13/92* (2014.09); *H04W 4/00* (2013.01); *H04W 4/12* (2013.01); *H04W 4/80* (2018.02); *A63F 2300/301* (2013.01); *A63F 2300/8017* (2013.01); *H04L 49/201* (2013.01); *H04L 2012/5641* (2013.01); *H04W 4/027* (2013.01); *H04W 4/06* (2013.01)

(56) References Cited

U.S. PATENT DOCUMENTS

| | | | |
|---|---|---|---|
| 2005/0197187 A1* | 9/2005 | Mitsuyoshi | A63F 13/12 463/31 |
| 2005/0200695 A1 | 9/2005 | Maeda | |
| 2006/0058103 A1* | 3/2006 | Danieli | A63F 13/12 463/42 |
| 2006/0116164 A1* | 6/2006 | Kang | H04M 1/72527 455/557 |
| 2007/0117635 A1* | 5/2007 | Spanton | A63F 13/12 463/43 |
| 2008/0003951 A1 | 1/2008 | Kuwahara et al. | |
| 2008/0119286 A1* | 5/2008 | Brunstetter | A63F 13/00 463/43 |
| 2009/0209170 A1* | 8/2009 | Richter | A63H 3/28 446/297 |
| 2010/0093429 A1* | 4/2010 | Mattice | G07F 1/06 463/25 |
| 2011/0107220 A1* | 5/2011 | Perlman | A63F 13/12 715/720 |
| 2011/0143840 A1 | 6/2011 | Sotoike et al. | |
| 2012/0054790 A1* | 3/2012 | Kim | H04N 21/43637 725/30 |
| 2012/0218930 A1* | 8/2012 | Okajima | G06F 13/42 370/312 |
| 2012/0220241 A1* | 8/2012 | Mizuguchi | A63F 13/12 455/68 |
| 2012/0244833 A1* | 9/2012 | Beattie, Jr. | H04W 24/08 455/406 |
| 2012/0309537 A1* | 12/2012 | Nogami | A63F 13/00 463/39 |
| 2013/0123019 A1* | 5/2013 | Sullivan | A63F 13/424 463/42 |
| 2013/0185140 A1* | 7/2013 | Pradeep | G06Q 30/02 705/14.41 |
| 2013/0196673 A1* | 8/2013 | Smadi | H04W 56/001 455/450 |
| 2014/0019542 A1* | 1/2014 | Rao | H04L 67/306 709/204 |
| 2014/0113718 A1* | 4/2014 | Norman | A63F 13/12 463/31 |
| 2014/0280316 A1* | 9/2014 | Ganick | G06F 17/30522 707/769 |
| 2014/0364211 A1 | 12/2014 | Masuda | |
| 2015/0121437 A1* | 4/2015 | Tan | H04N 21/2187 725/93 |
| 2016/0057504 A1* | 2/2016 | Shelby | H04W 72/1215 725/62 |
| 2016/0250553 A1* | 9/2016 | Ikenaga | A63F 13/86 463/31 |
| 2017/0072322 A1* | 3/2017 | Navok | A63F 13/86 |
| 2018/0032997 A1* | 2/2018 | Gordon | G06Q 20/3224 |

FOREIGN PATENT DOCUMENTS

| | | |
|---|---|---|
| JP | 2007-140590 | 6/2007 |
| JP | 2008-11093 | 1/2008 |
| JP | 2011-124909 | 6/2011 |
| JP | 2014-236785 | 12/2014 |
| JP | 2015-2895 | 1/2015 |

* cited by examiner

INFORMATION PROCESSING SYSTEM, INFORMATION PROCESSING METHOD, INFORMATION PROCESSING APPARATUS, AND NON-TRANSITORY STORAGE MEDIUM ENCODED WITH COMPUTER READABLE INFORMATION PROCESSING PROGRAM

This nonprovisional application is based on Japanese Patent Application No. 2015-195881 filed with the Japan Patent Office on Oct. 1, 2015, the entire contents of which are hereby incorporated by reference.

FIELD

The present disclosure relates to an information processing system made up of a plurality of information processing apparatuses capable of exchanging information with one another through a radio communication unit, an information processing method therein, an information processing apparatus used therein, and a non-transitory storage medium encoded with a computer readable information processing program executed by an information processing apparatus.

BACKGROUND AND SUMMARY

A configuration for match-up play through radio communication among a plurality of game devices has been known.

In general, in a configuration for match-up play through radio communication among a plurality of game devices, each of the plurality of game devices is configured to store a game program in a memory and to read and execute the stored game program. Therefore, each of the plurality of game devices should be able to use a game program, which may be a barrier for a plurality of users to enjoy the same game.

An exemplary embodiment provides an information processing system that includes a first information processing apparatus and a second information processing apparatus. Each of the first information processing apparatus and the second information processing apparatus includes a display, an operation portion, and a radio communication unit. The second information processing apparatus includes a first transmission module configured to directly transmit operation information accepted by the operation portion of the second information processing apparatus to the first information processing apparatus through the radio communication unit. The first information processing apparatus includes an execution module configured to perform application processing based on operation information accepted by the operation portion of the first information processing apparatus and the operation information from the second information processing apparatus, a first representation control module configured to generate an application image including a result of execution of the application processing and to have the application image shown on the display of the first information processing apparatus, and a second transmission module configured to directly transmit the application image to the second information processing apparatus through the radio communication unit of the first information processing apparatus. The second information processing apparatus includes a second representation control module configured to have the application image from the first information processing apparatus shown on the display of the second information processing apparatus.

The first transmission module may transmit the operation information to the first information processing apparatus in unicast.

The second transmission module may transmit the application image to the second information processing apparatus in either broadcast or multicast.

The second transmission module may transmit, in addition to the application image, audio data generated through the application processing to the second information processing apparatus.

The second transmission module may transmit, in addition to the application image, vibration data generated through the application processing to the second information processing apparatus.

The first information processing apparatus may execute a game program. The second information processing apparatus may execute a program simpler than the game program.

The simpler program may be configured to be executable with any of a plurality of game programs.

The first information processing apparatus may include a first storage unit for storing the game program in advance, and the second information processing apparatus may include a second storage unit for storing the simpler program in advance.

An output module of the first information processing apparatus may convert the application image to a prescribed resolution and transmit the converted application image to the second information processing apparatus.

The second transmission module may transmit an application image which is integration of application images generated for respective second information processing apparatuses. The second representation control module may have the display show an image in a region corresponding to the second information processing apparatus, of the integrated application image.

The information processing system further includes a third information processing apparatus. The third information processing apparatus includes a display, an operation portion, and a radio communication unit. The third information processing apparatus may include a control module configured to inactivate transmission of operation information accepted by the operation portion of the third information processing apparatus to the first information processing apparatus but to have the application image from the first information processing apparatus shown on the display of the third information processing apparatus.

The control module of the third information processing apparatus may activate transmission of the operation information accepted by the operation portion of the third information processing apparatus to the first information processing apparatus in response to an operation accepted by the operation portion of the third information processing apparatus while the display continues to show the application image.

The third information processing apparatus may continue representation of the application image also after transmission of the operation information to the first information processing apparatus is activated.

The first information processing apparatus may transmit a message for having the second information processing apparatus start transmission of the operation information to the first information processing apparatus.

The second information processing apparatus may activate only a message satisfying a predetermined condition, among messages transmitted from the first information processing apparatus.

The second information processing apparatus may be configured to be able to receive a message transmitted from the first information processing apparatus while a specific application is not executed.

The first information processing apparatus may be configured to transmit the application image and the message in frequency bands different from each other, and the second information processing apparatus may receive the application image and receive the message by sequentially switching between the frequency bands in which the radio communication unit effectively communicates.

The message transmitted from the first information processing apparatus may include advertisement information.

A scheme for communication of the message transmitted from the first information processing apparatus may be different depending on a type of the second information processing apparatus.

The first information processing apparatus may transmit the application image under an identical communication scheme after transmission of the message.

The first information processing apparatus may determine whether or not to permit transmission of the operation information to the first information processing apparatus by the second information processing apparatus in accordance with an operation by a user.

The radio communication unit may establish near field radio communication.

An exemplary embodiment provides an information processing method in an information processing system including a first information processing apparatus and a second information processing apparatus. Each of the first information processing apparatus and the second information processing apparatus includes a display, an operation portion, and a radio communication unit. The information processing method includes directly transmitting, at the second information processing apparatus, operation information accepted by the operation portion of the second information processing apparatus to the first information processing apparatus through the radio communication unit, performing, at the first information processing apparatus, application processing based on operation information accepted by the operation portion of the first information processing apparatus and the operation information from the second information processing apparatus, generating, at the first information processing apparatus, an application image including a result of execution of the application processing and showing the application image on the display of the first information processing apparatus, directly transmitting, at the first information processing apparatus, the application image to the second information processing apparatus through the radio communication unit of the first information processing apparatus, and showing, at the second information processing apparatus, the application image from the first information processing apparatus on the display of the second information processing apparatus.

An exemplary embodiment provides an information processing apparatus capable of radio communication with another information processing apparatus. The information processing apparatus includes a display, an operation portion, a radio communication unit, an execution module configured to perform application processing based on operation information accepted by the operation portion of the information processing apparatus and operation information from the another information processing apparatus, a representation control module configured to generate an application image including a result of execution of the application processing and to have the application image shown on the display of the information processing apparatus, and a transmission module configured to directly transmit the application image to the another information processing apparatus through the radio communication unit of the information processing apparatus for showing the application image on a display of the another information processing apparatus.

A non-transitory storage medium encoded with a computer readable information processing program executed by an information processing apparatus capable of radio communication with another information processing apparatus is provided. The information processing apparatus includes a display, an operation portion, and a radio communication unit. The information processing program causes the information processing apparatus to perform the acts including performing application processing based on operation information accepted by the operation portion of the information processing apparatus and operation information from the another information processing apparatus, generating an application image including a result of execution of the application processing and showing the application image on the display of the information processing apparatus, and directly transmitting the application image to the another information processing apparatus through the radio communication unit of the information processing apparatus for showing the application image on a display of the another information processing apparatus.

An exemplary embodiment provides an information processing method in an information processing apparatus capable of radio communication with another information processing apparatus. The information processing apparatus includes a display, an operation portion, and a radio communication unit. The information processing method includes performing application processing based on operation information accepted by the operation portion of the information processing apparatus and operation information from the another information processing apparatus, generating an application image including a result of execution of the application processing and showing the application image on the display of the information processing apparatus, and directly transmitting the application image to the another information processing apparatus through the radio communication unit of the information processing apparatus for showing the application image on a display of the another information processing apparatus.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
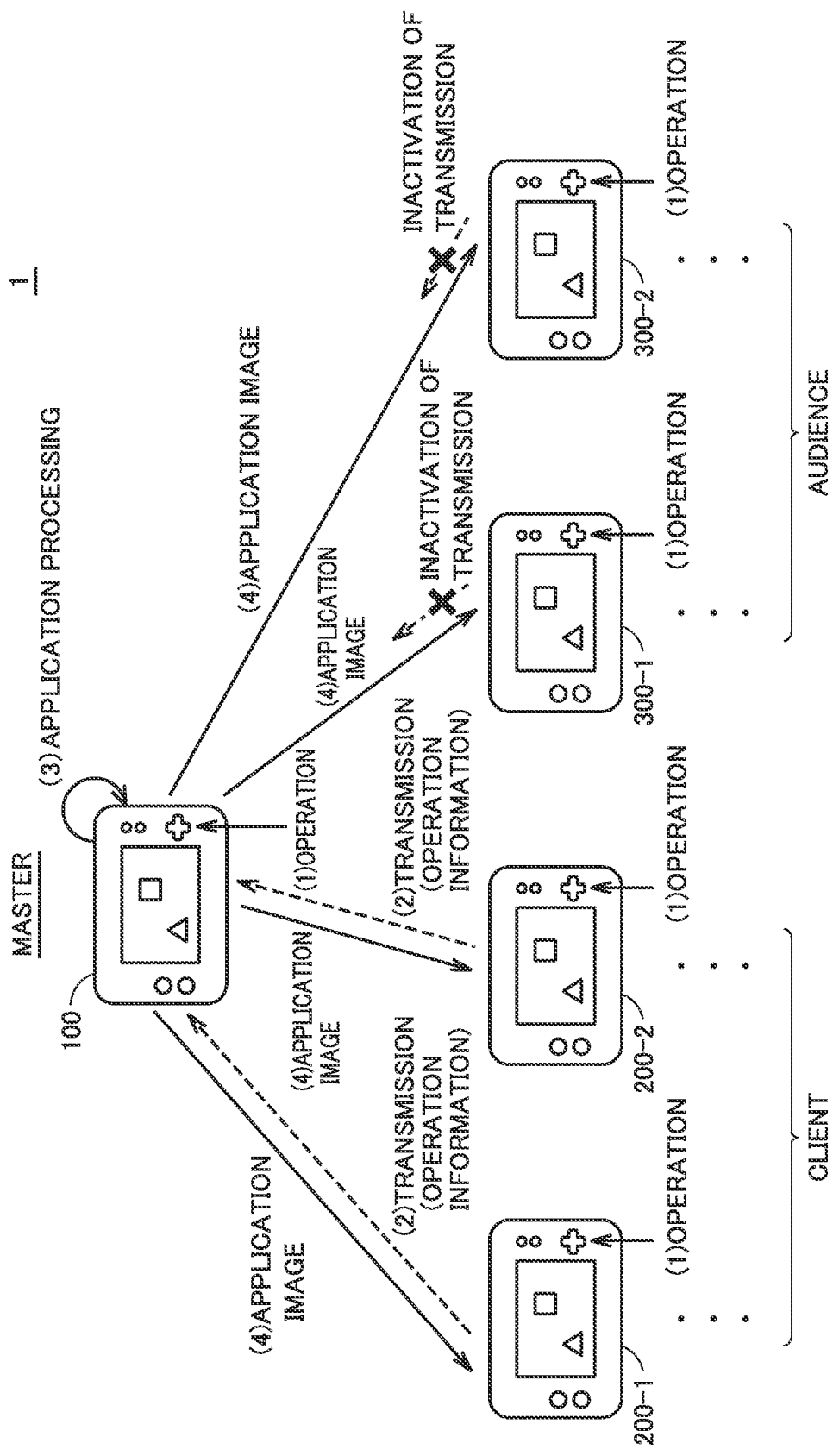
FIG. 1 shows an exemplary illustrative non-limiting drawing illustrating overview of an information processing system according to the present embodiment.

The present embodiment will be described in detail with reference to the drawings. The same or corresponding elements in the drawings have the same reference characters allotted and description thereof will not be repeated.

[A. Information Processing System 1]

Overview of an information processing system 1 according to the present embodiment will be described with reference to FIG. 1.

Information processing system 1 includes a plurality of information processing apparatuses 100, 200-1, 200-2, . . . , and 300-1, 300-2, . . . which can exchange information with one another through radio communication. A plurality of information processing apparatuses shown in FIG. 1 are categorized into an information processing apparatus 100 functioning as a master (parent) (hereinafter may also be abbreviated as a "master"), information processing apparatuses 200-1, 200-2, . . . functioning as clients (children) (hereinafter also collectively referred to as an "information processing apparatus 200" or may also be abbreviated as a "client"), and information processing apparatuses 300-1, 300-2, . . . functioning as audiences (hereinafter also collectively referred to as an "information processing apparatus 300" or may also be abbreviated as an "audience").

Though FIG. 1 shows an example in which each information processing apparatus is categorized with attention being paid to a difference in operation mode as will be described below, information processing apparatuses 100, 200, and 300 are typically substantially the same in hardware configuration. Information processing apparatuses 100, 200, and 300 may be different from one another in hardware configuration.

Processing in information processing apparatus 100 including each operation mode of a master, a client, and an audience will briefly be described below.

Information processing system 1 according to the present embodiment is applied, for example, to applications where a plurality of users participate in a common game field and enjoy a game. Information processing apparatus 100 functioning as the master performs processing necessary for representation on information processing apparatus 100 itself and a plurality of information processing apparatuses including the clients and the audiences. The master generates an application image to be shown to the client and the audience included in information processing system 1 and directly transmits the application image to each information processing apparatus.

The "application image" herein means moving images and still images including a result of execution of application processing and may be any of rendering using a virtual camera, computer graphics, and actual video images. Though expressions along with progress of game processing will be described by way of example of an "application image" in the description below, any type of application is acceptable.

The client and the audience receive and show an application image transmitted from the master. Though the client can participate in an application executed by the master, the audience cannot participate in the application executed by the master. The client accepts an operation by a user onto the client apparatus and directly transmits operation information to the master. The master performs application processing in accordance with operation information transmitted from one client or a plurality of clients. The audience shows an image of an application (an application image) which proceeds as the master user and the client users participate. Even when the audience user performs some operation, operation information accepted by audience information processing apparatus 300 is not transmitted to the master. As will be described later, in response to a prescribed operation by the audience user, switching to an operation mode in which the user can participate in the application executed by the master, that is, the client, can also be made.

Typical processing in information processing system 1 includes acceptance of an operation from a master user and a client user ((1) operation). Each client transmits operation information indicating contents of the accepted operation to the master ((2) transmission). The master performs application processing in accordance with operation information indicating contents of the operation accepted by the master apparatus and operation information received from each client ((3) application processing). Then, the master transmits an application image including a result of execution of the application processing to the client and the audience ((4) application image). In information processing system 1, processing in (1) and (4) shown in FIG. 1 is repeated.

In information processing system 1, switching between the master and the client, between the client and the audience, and between the master and the audience may be made. For example, an information processing apparatus operating as the client may operate as the master in response to an explicit or implicit instruction.

[B. Hardware Configuration of Information Processing Apparatuses 100, 200, and 300]

A hardware configuration of information processing apparatuses 100, 200, and 300 included in information processing system 1 will be described with reference to FIG. 2. Information processing apparatuses 100, 200, and 300 are the same in hardware configuration and information processing apparatus 100 will be described below by way of example.

Though information processing apparatus 100 can include any computer having a radio communication function, an example in which a portable game device is mounted will mainly be described below. In another mount example, a portable (also referred to as mobile) device such as a portable telephone or a smart device may be applicable or a stationary apparatus such as a personal computer or a home game machine may be acceptable.

Information processing apparatus 100 includes a processor 102, a main storage unit 104, an auxiliary storage unit 106, an external interface 112, a display 114, an operation portion 116, an audio output unit 118, a radio communication unit 120, an acceleration sensor 122, and a gyro sensor 124. These components are connected to one another to be able to communicate data through a bus 126.

Processor 102 is a processing entity (processing module) for performing processing provided by information processing apparatus 100. Processor 102 reads an operating system (OS) 108 and an application program 110 stored in auxiliary storage unit 106, develops the operating system and the application program on main storage unit 104, and performs information processing as will be described later.

Main storage unit 104 is any storage device (storage medium) which can be accessed by processor 102, and mounted, for example, as a volatile storage device such as a dynamic random access memory (DRAM).

Auxiliary storage unit 106 is mounted, for example, as a non-volatile storage medium such as a hard disk or a flash memory. Alternatively, auxiliary storage unit 106 may be mounted, for example, as a storage medium attachable to and removable from information processing apparatus 100 such as an optical disc and a cartridge. In this case, combination of information processing apparatus 100 and any storage medium may be configured as an information processing system.

External interface 112 mediates exchange of data with any memory card or an external device. External interface 112 is mounted, for example, as a reader-writer which reads and writes data by being electrically connected to a memory card and a universal serial bus (USB) interface which exchanges data with an external device.

Display 114 shows an image generated as a result of information processing performed by processor 102. Display 114 may show an image received from another apparatus. A plurality of displays 114 may be provided. Information processing apparatus 100 may make use of another display or a plurality of other displays.

Operation portion 116 mainly accepts an operation from a user of information processing apparatus 100. Operation portion 116 is mounted, for example, as a push button, an operation lever, a touch panel, or a mouse. Alternatively, a controller separate from information processing apparatus 100 and connected through a wire or wirelessly may be adopted as operation portion 116.

Audio output unit 118 outputs voice and sound generated as a result of information processing performed by processor 102. Voice and sound received from another apparatus may be output to audio output unit 118. Audio output unit 118 is mounted, for example, as one speaker or a plurality of speakers arranged around the display and an amplifier driving the speaker. Alternatively, audio output unit 118 may be mounted as a connector for electrical connection to a headphone and an amplifier driving the headphone connected via the connector.

Radio communication unit 120 transmits and receives data to and from another apparatus through a radio signal. Radio communication unit 120 is mounted, for example, by using a wireless local area network (LAN) under 802.11 standards, near field radio communication under Bluetooth™ standards, infrared communication, or mobile communication under long term evolution (LTD) standards. Though FIG. 2 collectively shows a block of radio communication unit 120, a plurality of types of radio communication functions may be mounted or a plurality of radio communication functions of a single type may be prepared in accordance with a communication counterpart. Radio communication unit 120 may be integrated with processor 102.

Acceleration sensor 122 is a device which detects an acceleration generated in information processing apparatus 100. Gyro sensor 124 is a device which detects inclination or the like of information processing apparatus 100. An operation performed by a user who holds information processing apparatus 100 can be detected with at least one or both of acceleration sensor 122 and gyro sensor 124.

Figure 2:
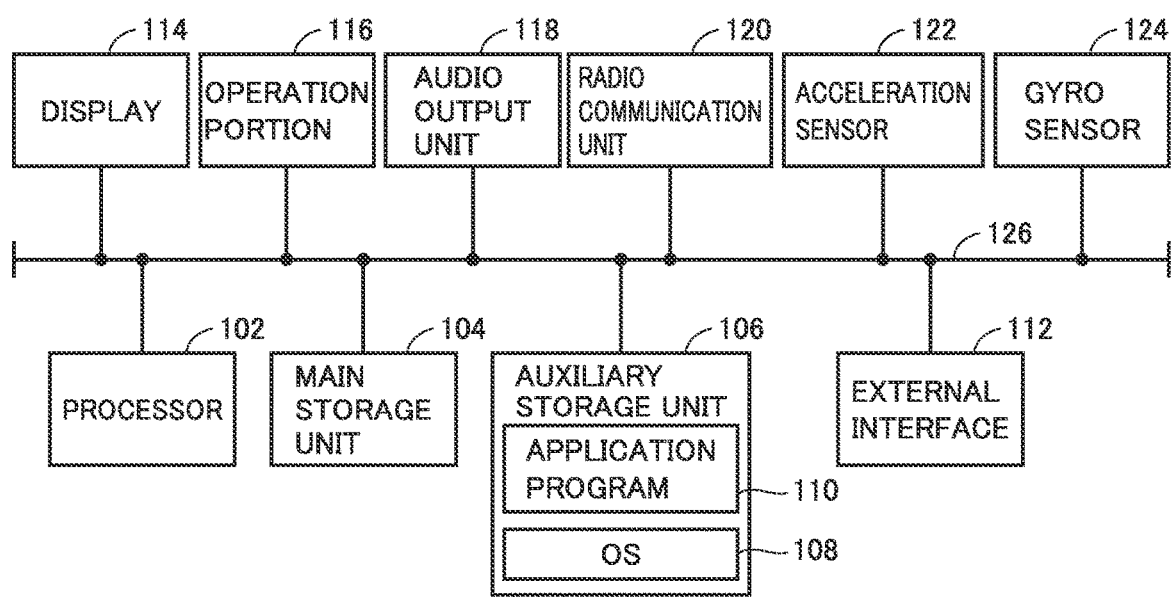
FIG. 2 shows an exemplary illustrative non-limiting drawing illustrating a hardware configuration of an information processing apparatus included in the information processing system according to the present embodiment.

Though FIG. 2 shows information processing apparatus 100 as an integrated apparatus, the information processing apparatus may be mounted as an assembly of a plurality of apparatuses. Information processing apparatus 100 may be mounted as a combination of a plurality of independent apparatuses. For example, a first apparatus including elements corresponding to processor 102, display 114, operation portion 116, and audio output unit 118 and a second apparatus including an element corresponding to radio communication unit 120 may removably be connected to each other. Such a configuration may be referred to as an information processing system instead of an information processing apparatus. Alternatively, such a configuration that a main body apparatus including elements corresponding to processor 102, main storage unit 104, and auxiliary storage unit 106 is separate from a terminal apparatus including display 114, operation portion 116, and audio output unit 118 may be adopted.

In another embodiment, at least a part of information processing performed by information processing apparatus 100 may be performed by another apparatus or a plurality of other apparatuses arranged as being distributed over a network (a wide area network and/or a local network).

Though FIG. 1 shows a configuration example in which information processing apparatuses exchange data directly through radio communication, data may be exchanged between some information processing apparatuses or all information processing apparatuses under another communication scheme as necessary. For example, communication via an access point or communication via the Internet may be adopted. In this case, a component in accordance with the communication scheme is preferably adopted as radio communication unit 120 or as a component associated with communication.

[C. Execution of Application Processing]

Processing performed in each of information processing apparatuses (master, client, and audience) included in information processing system 1 according to the present embodiment will now be described with reference to FIGS. 3 and 4.

In information processing apparatus 100 functioning as the master, a game program 140 for implementing processing as will be described later is executed. Game program 140 is installed through any storage medium (for example, a semiconductor storage device or a communication line). Information processing apparatus 200 functioning as the client and information processing apparatus 300 functioning as the audience execute respective interface programs 240 and 340 simpler in processing contents than game program 140 (that is, smaller in amount of contained instruction codes).

A program itself may be the same between interface program 240 and interface program 340 and executed contents may be switched in accordance with an operation mode. Furthermore, a program including all of game program 140, interface program 240, and interface program 340 may be installed in each information processing apparatus and a corresponding program may selectively be executed in accordance with an operation mode designated by a user.

Interface programs 240 and 340 are preferably configured to be executable with any of a plurality of applications (game programs). For example, interface programs 240 and 340 may be mounted as a part of a basic application such as a launcher or an OS installed in advance in an information processing apparatus. Alternatively, the interface program may be executed on another game program executed in information processing apparatus 200. In this case, interface program 240 and interface program 340 are mounted as a type of a program module and called at any timing by another program.

Figure 3:
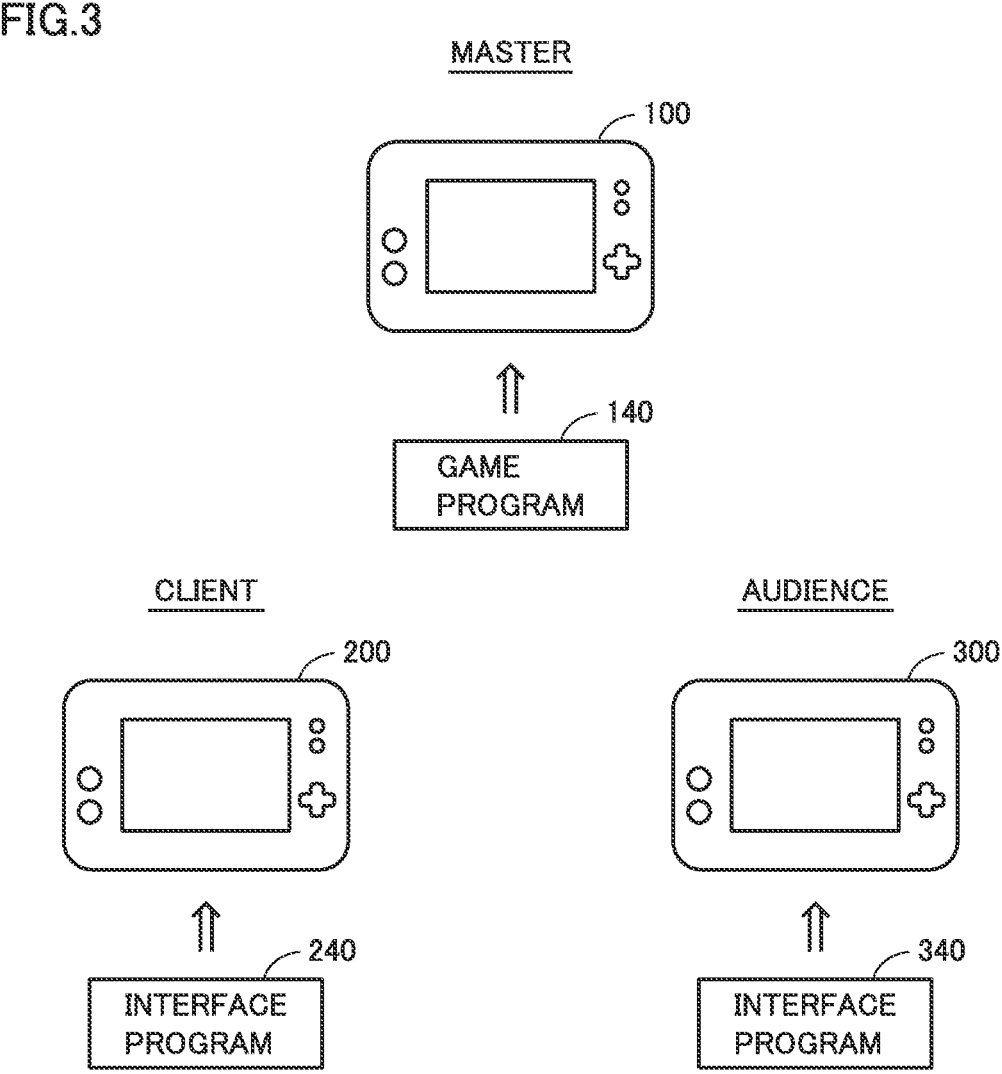
FIG. 3 shows an exemplary illustrative non-limiting drawing illustrating programs executed in information processing apparatuses included in the information processing system according to the present embodiment.
Figure 4:
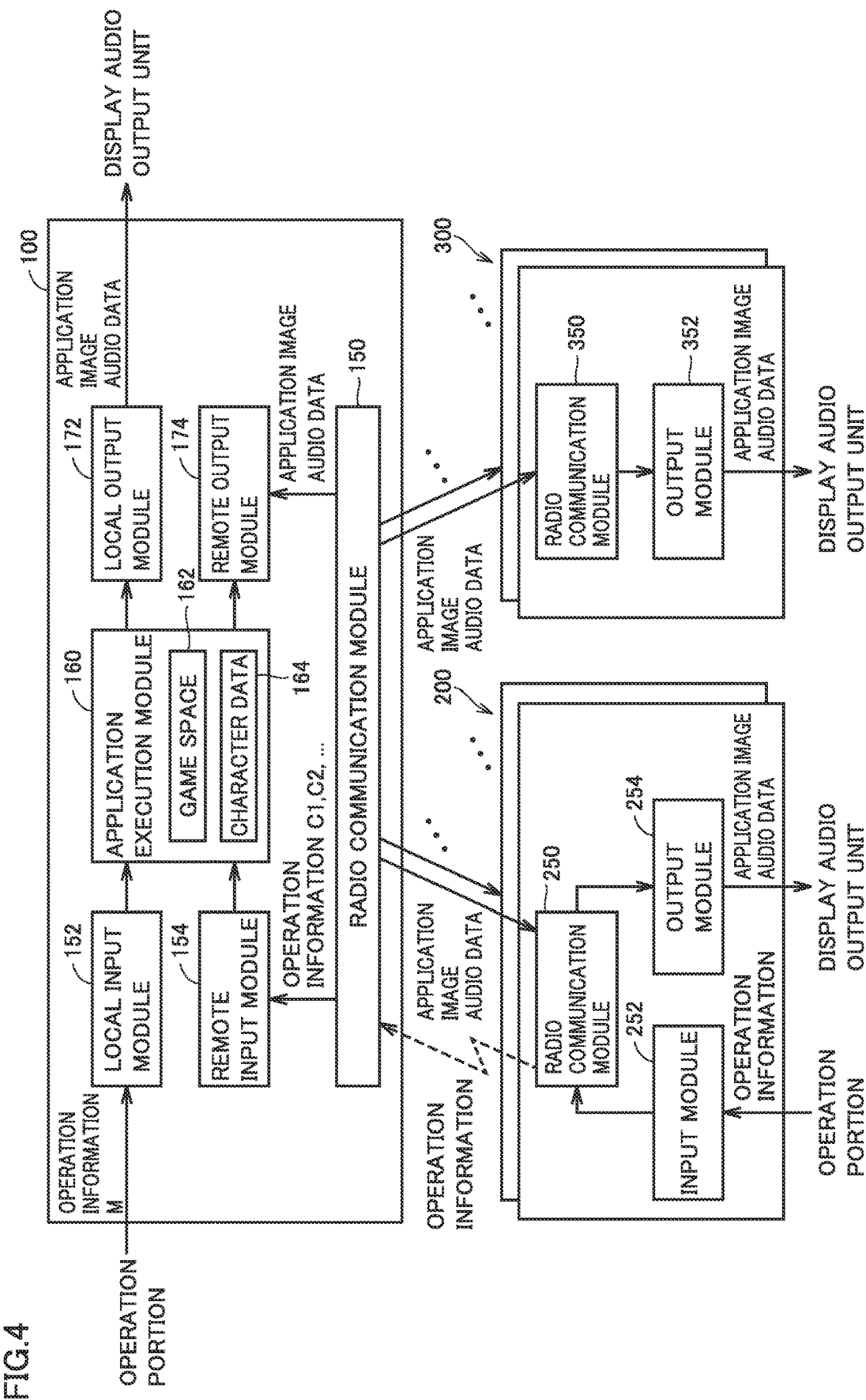
FIG. 4 shows an exemplary illustrative non-limiting drawing illustrating a software configuration for implementing the information processing apparatuses included in the information processing system according to the present embodiment.

A module included in each information processing apparatus shown in FIG. 4 is implemented typically by execution by processor 102 (FIG. 2) of a corresponding program shown in FIG. 3. A module included in each information processing apparatus shown in FIG. 4 may be mounted as a software module. The entirety or a part of the module may be mounted as hardware such as an application specific integrated circuit (ASIC), without being limited.

Referring to FIG. 4, information processing apparatus 100 functioning as the master includes a radio communication module 150, a local input module 152, a remote input module 154, an application execution module 160, a local output module 172, and a remote output module 174. These modules are implemented by execution of game program 140 by information processing apparatus 100.

Radio communication module 150 mediates data exchange through a radio signal between remote input module 154 and remote output module 174, and information processing apparatus 200 functioning as the client and information processing apparatus 300 functioning as the audience. Radio communication module 150 corresponds to a layer performing processing in a higher-order layer in accordance with a result of exchange of the radio signal by radio communication unit 120 (FIG. 2).

Local input module 152 outputs operation information M generated in response to an operation by a user which has been accepted by operation portion 116 (FIG. 2) of information processing apparatus 100 to application execution module 160. Remote input module 154 receives operation information C1, C2, . . . from each of information processing apparatuses 200 functioning as the clients through radio communication module 150 and outputs the operation information to application execution module 160. In order to distinguish a source of generation of operation information, operation information generated by operation portion 116 of the information processing apparatus functioning as the master is denoted as "operation information M" and operation information generated by operation portion 116 of the information processing apparatus functioning as the client is denoted as "operation information C1, C2, . . . ."

Application execution module 160 performs application processing based on operation information accepted by operation portion 116 of information processing apparatus 100 and operation information from information processing apparatus 200 functioning as the client. More specifically, application execution module 160 implements simultaneous play between the master user and the client user. Application execution module 160 holds a game space 162 and character data 164, and performs application processing based on operation information M from the master and operation information C1, C2, . . . from the client. Application execution module 160 proceeds with game processing based on operation information from users who participate in a game.

Local output module 172 and remote output module 174 output a result of execution of application processing by application execution module 160. Local output module 172 generates an application image including a result of execution of application processing and has display 114 of information processing apparatus 100 show the application image. Remote output module 174 transmits the application image to information processing apparatus 200 functioning as the client through radio communication unit 120 of information processing apparatus 100.

Local output module 172 outputs the application image generated through execution of application processing to display 114 (FIG. 2) and outputs audio data to audio output unit 118 (FIG. 2). Remote output module 174 transmits the application image and the audio data generated through execution of application processing to the information processing apparatuses functioning as the client and the audience through radio communication module 150. Remote output module 174 transmits, in addition to the application image, the audio data generated through application processing to information processing apparatus 200 functioning as the client.

Information on an application image and voice and sound may be compressed with a prescribed compression method and transmitted to information processing apparatus 200 functioning as the client. Different compression methods suitable for an application image and voice and sound, respectively, may be adopted, or both of the application image and the voice and sound may be compressed with the same compression method.

Depending on contents of application processing, audio data may not be output and only an application image may be output. Alternatively, to the contrary, an application image may not be output and only audio data may be output.

In information processing apparatus 200 functioning as the client, interface program 240 which is a program simpler than game program 140 executed in information processing apparatus 100 functioning as the master is executed. In information processing system 1 according to the present embodiment, main operation necessary for application processing is performed in information processing apparatus 100 functioning as the master and only input and output processing involved with a user interface is basically performed in information processing apparatus 200 functioning as the client.

More specifically, information processing apparatus 200 includes a radio communication module 250, an input module 252, and an output module 254. Radio communication module 250 mediates exchange of data through a radio signal between input module 252 and output module 254, and information processing apparatus 100 functioning as the master. Radio communication module 250 corresponds to a layer performing processing in a higher-order layer in accordance with a result of exchange of a radio signal by radio communication unit 120 (FIG. 2).

Input module 252 transmits through radio communication module 250, operation information generated in response to an operation by a user which has been accepted by operation portion 116 (FIG. 2) of information processing apparatus 200 to information processing apparatus 100 functioning as the master.

Output module 254 receives an application image and audio data through radio communication module 250 from information processing apparatus 100 functioning as the master, and outputs the application image to display 114 (FIG. 2) and outputs the audio data to audio output unit 118 (FIG. 2).

Information processing apparatus 300 functioning as the audience executes interface program 340 simpler than any of game program 140 executed by information processing apparatus 100 functioning as the master and interface program 240 executed by information processing apparatus 200 functioning as the client. Information processing apparatus 300 functioning as the audience provides only a function to check a state of play by other users.

More specifically, information processing apparatus 300 includes a radio communication module 350 and an output module 352. Radio communication module 350 is similar to radio communication module 250 of information processing apparatus 200 functioning as the client and output module 352 is similar to output module 254 of information processing apparatus 200 functioning as the client.

A function corresponding to input module 252 is not activated in information processing apparatus 300, and operation information in response to an operation by a user onto operation portion 116 of information processing apparatus 300 is not transmitted to information processing apparatus 100 functioning as the master. Information processing apparatus 300 has a function to inactivate transmission of operation information accepted by operation portion 116 of information processing apparatus 300 to information processing apparatus 100 but to have display 114 of information processing apparatus 300 show an application image from information processing apparatus 100.

A program necessary for configuring information processing system 1 according to the present embodiment may be stored in advance in a corresponding information processing apparatus. Information processing apparatus 100 functioning as the master may have a storage unit (for example, auxiliary storage unit 106 or main storage unit 104 shown in FIG. 2) store game program 140 in advance. Information processing apparatus 200 functioning as the client may have a storage unit store in advance interface program 240 which is a simple program, and similarly, information processing apparatus 300 functioning as the audience may have a storage unit store in advance interface program 340 which is a simple program.

[D. Communication Scheme Between Master, and Client and Audience]

In information processing system 1 according to the present embodiment, each of information processing apparatuses 200 functioning as the clients corresponds to a type of an operation terminal including functions corresponding to display 114, operation portion 116, and audio output unit 118, when viewed from information processing apparatus 100 functioning as the master. Each of information processing apparatuses 300 functioning as the audiences corresponds to a type of a display terminal including functions corresponding to display 114 and audio output unit 118 when viewed from information processing apparatus 100 functioning as the master.

The master should identify operation information transmitted from each client and perform application processing. In input processing in the master, when the master receives some kind of operation information from any client, the master should specify contents of received operation information and a sender of the received operation information. In contrast, in typical output processing in the master, the master transmits the same application image and audio data to a plurality of information processing apparatuses.

In information processing system 1 according to the present embodiment, in one form, a communication scheme for transmitting operation information from information processing apparatus 200 functioning as the client and a communication scheme for transmitting an application image and audio data from information processing apparatus 100 functioning as the master are adapted to respective purposes.

Figure 5:
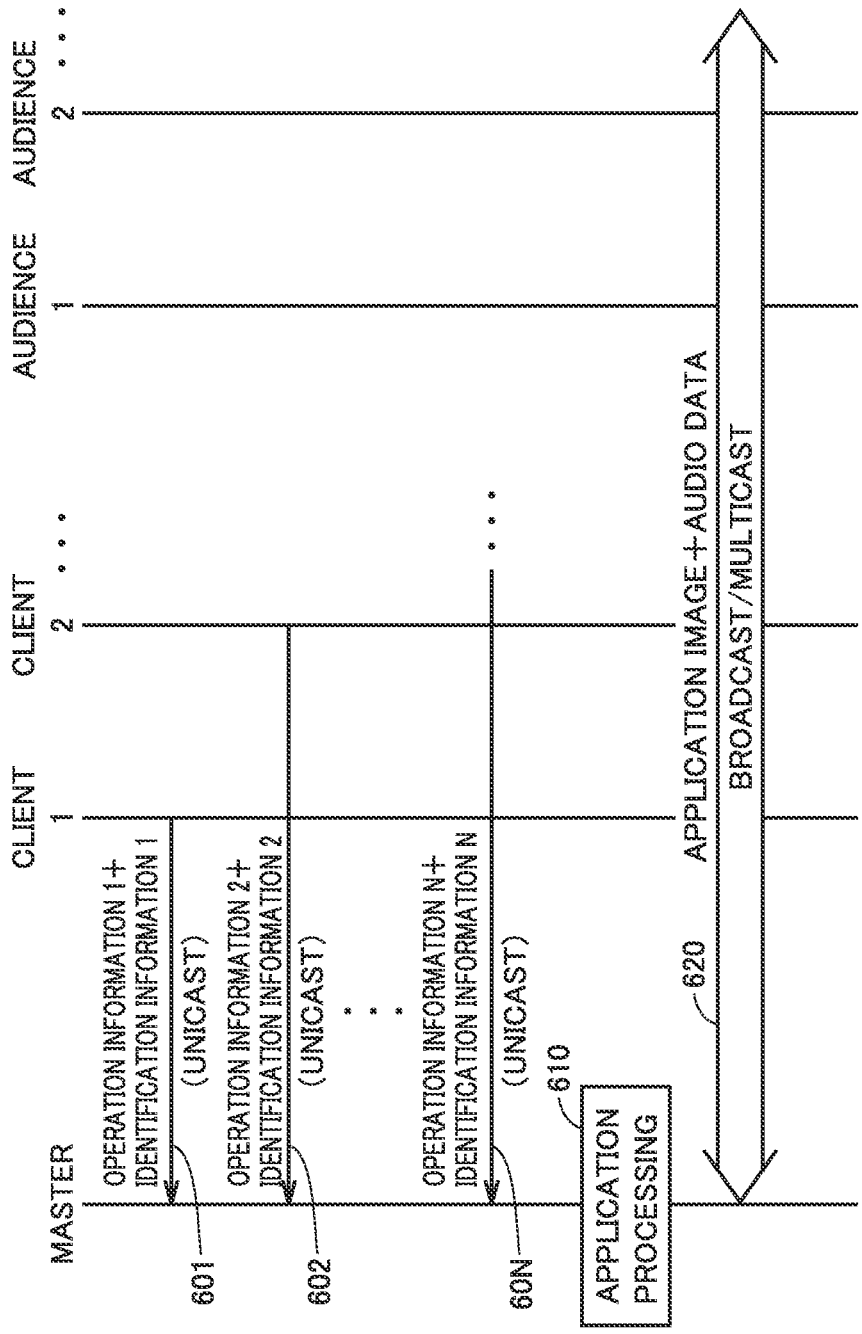
FIG. 5 shows an exemplary illustrative non-limiting drawing illustrating a communication scheme among the information processing apparatuses in the information processing system according to the present embodiment.

A scheme for communication among information processing apparatuses in information processing system 1 according to the present embodiment will be described with reference to FIG. 5. Respective pieces of operation information 1, 2, . . . , and N transmitted from clients 1, 2, . . . , and N are transmitted as data 601, 602, . . . , and 60N in a unicast format of which destinations are designated. Data 601, 602, . . . , and 60N include respective pieces of identification information 1, 2, . . . , and N for specifying sender clients, in addition to corresponding pieces of operation information 1, 2, . . . , and N. Each piece of identification information 1, 2, . . . , and N may explicitly be included in a data frame or may be included in a packet header. When identification information is included in a packet header, radio communication unit 120 incorporates the identification information under a predetermined protocol. Therefore, interface program 240 executed by information processing apparatus 200 functioning as the client does not have to perform explicit processing for incorporating identification information in a data frame.

Radio communication unit 120 of information processing apparatus 200 functioning as the client transmits operation information to information processing apparatus 100 functioning as the master in unicast. By using transmission data in such a unicast format, information processing apparatus 100 functioning as the master specifies contents of operation information included in received data and a sender of the operation information and performs application processing (typically, game processing) 610.

Information processing apparatus 100 functioning as the master transmits an application image and audio data including a result of execution of application processing to the client and/or the audience. It is also assumed that the master does not know in advance which information processing apparatus functions as the audience. Such an application that the master invites any information processing apparatus within coverage of radio communication to participate as audience is also assumed.

Therefore, in information processing system 1 according to the present embodiment, radio communication unit 120 of information processing apparatus 100 functioning as the master transmits a generated application image and audio data to another information processing apparatus in either broadcast or multicast (reference 620). In the broadcast format, received data can be used in all information processing apparatuses which can receive a radio signal sent from the master. In the multicast format, the master designates a plurality of destinations and then transmits a generated application image and audio data. The same data can be used among a plurality of information processing apparatuses designated as destinations by the master.

In the unicast format, the number of information processing apparatuses which can simultaneously exchange data is limited to a certain upper limit. In the broadcast format and the multicast format, however, the number of information processing apparatuses which can receive and use data is larger than in the case of the unicast format, and the number of connections is not limited in some cases.

By thus optimizing a communication scheme between the master, and the client and the audience, progress of application processing (game processing) based on operation information transmitted from the client can further be stabilized, the number of information processing apparatuses which can participate as the audience can be increased, and application to such applications as inviting more users to participate can also be facilitated.

[E. Transition of Operation Mode]

Processing for transition among operation modes of the master, the client, and the audience will now be described with reference to FIG. 6. The information processing apparatus according to the present embodiment may be set to any operation mode of the master, the client, and the audience in response to an operation by a user.

For example, when a user of an information processing apparatus in which game program 140 (FIG. 3) has been installed indicates start of a game ((1) instruction to start game), the information processing apparatus functions as the master. When an information processing apparatus functions as the master, typically, application processing 180 and notification processing 182 are performed. Notification processing 182 is processing for informing another information processing apparatus of the fact that application processing (game processing) is available.

When a user of an information processing apparatus which has received a notification message from information processing apparatus 100 functioning as the master indicates participation in the game ((2) instruction to participate in game), the information processing apparatus functions as the client. When an information processing apparatus functions as the client, typically, notification reception representation processing 280, image and audio output processing 282, and operation information transmission processing 284 are performed. Notification reception representation processing 280 is processing for showing a notification message from information processing apparatus 100 functioning as the master. Image and audio output processing 282 is processing for showing an application image from information processing apparatus 100 functioning as the master and outputting audio data. Operation information transmission processing 284 is processing for transmitting operation information generated in response to an operation by a user which has been accepted by operation portion 116 (FIG. 2) to information processing apparatus 100 functioning as the master.

Alternatively, when a user of an information processing apparatus which has received a notification message from information processing apparatus 100 functioning as the master indicates watch of a game ((3) instruction to participate as audience), the information processing apparatus functions as the audience. When an information processing apparatus functions as the audience, typically, notification reception representation processing 380 and image and audio output processing 382 are performed. Notification reception representation processing 380 and image and audio output processing 382 are the same as notification reception representation processing 280 and image and audio output processing 282, respectively. When the user of information processing apparatus 300 functioning as the audience indicates participation in the game ((4) instruction to participate in game), switching between operation modes from the audience to the client is made in the information processing apparatus.

When the master user indicates end of the game ((5) instruction to quit game) after application processing (game processing) is performed between the master and the client, the information processing apparatus quits the function as the master. When game program 140 (FIG. 3) has been installed in any information processing apparatus 200 which has been functioning as the client and when the user indicates takeover of application processing (game processing) ((6) instruction for takeover), switching between operation modes from the client to the master is made in the information processing apparatus.

[F. User Interface Screen]

One example of a user interface screen provided on an information processing apparatus will now be described with reference to FIGS. 7A to 7D, 8A to 8D, and 9. FIGS. 7A to 7D show user interface screen examples provided on an information processing apparatus in which game program 140 (FIG. 3) has been installed. FIGS. 8A to 8D and 9 show user interface screen examples provided on an information processing apparatus in which game program 140 (FIG. 3) or interface program 240 or 340 (FIG. 3) has been installed.

Figure 7A:
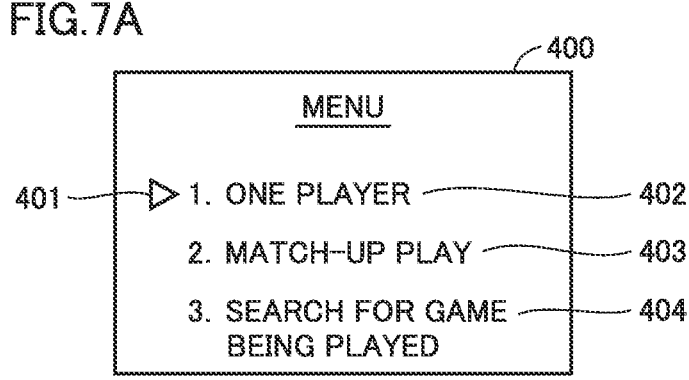
FIGS. 7A to 7D show exemplary illustrative non-limiting drawings illustrating user interface screen examples provided on the information processing apparatus in which a game program has been installed.

When a user executes game program 140 (FIG. 3), a menu screen 400 shown in FIG. 7A is shown on display 114. Menu screen 400 includes a plurality of choice items 402, 403, and 404, and the user operates a cursor 401 to select any choice item.

Choice item 402 is provided with a message "1. one player." When this choice item is selected, a user can play a game against the computer.

Choice item 403 is provided with a message "2. match-up play." When this choice item is selected, the information processing apparatus functions as the master. "(1) Instruction to start game" shown in FIG. 6 is given to the information processing apparatus. In this case, screens as shown in FIGS. 7B to 7D are successively shown.

Figure 6:
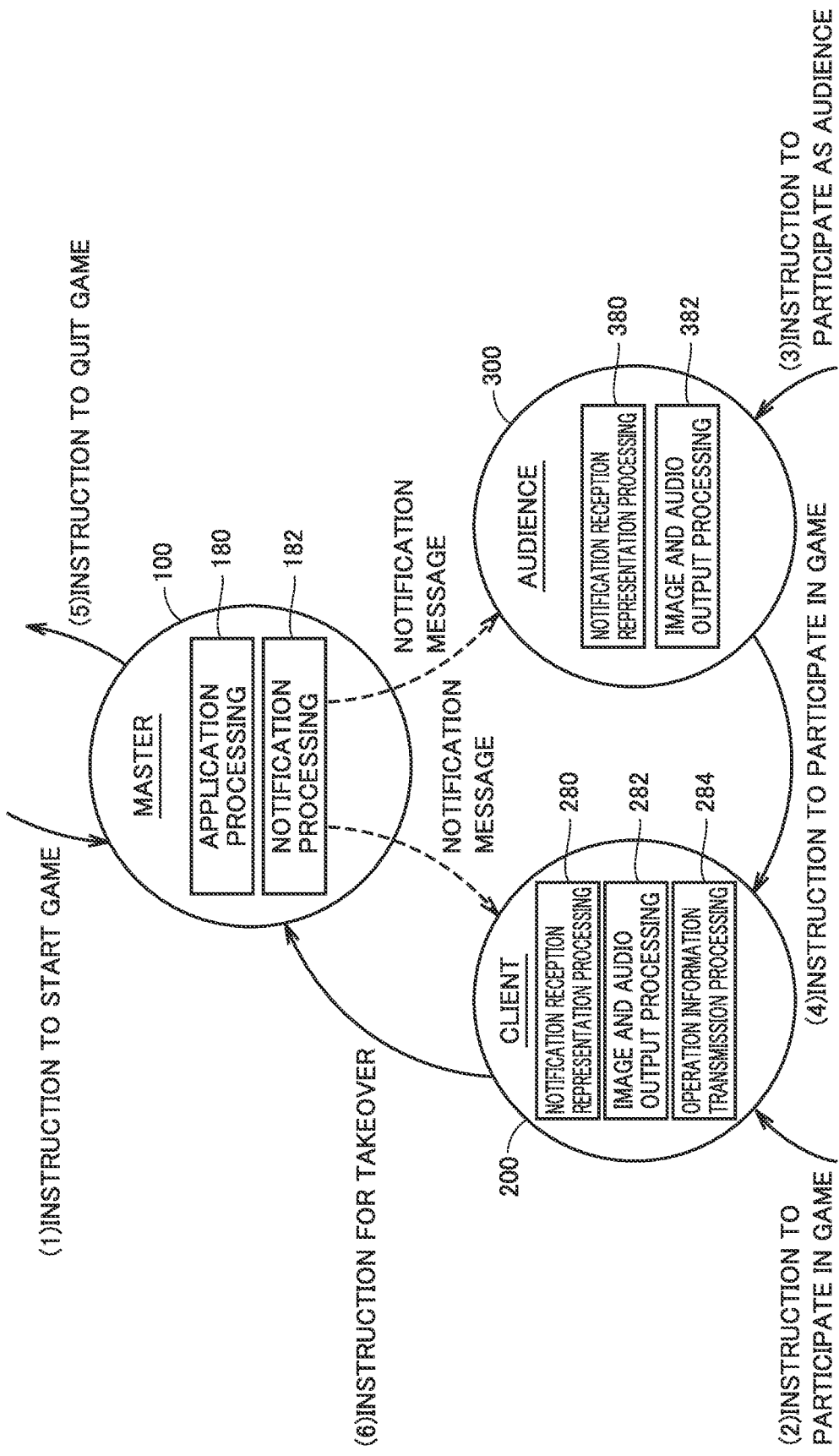
FIG. 6 shows an exemplary illustrative non-limiting drawing illustrating transition of an operation mode in the information processing system according to the present embodiment.
Figure 7B:
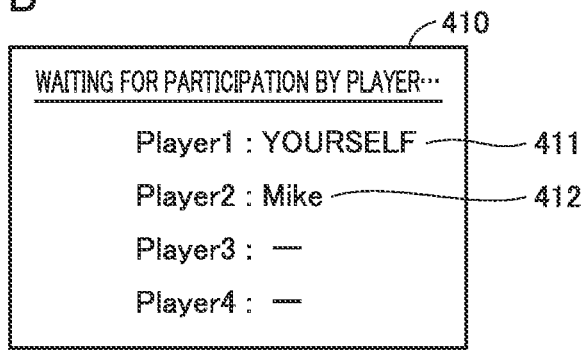
Figure 7C:
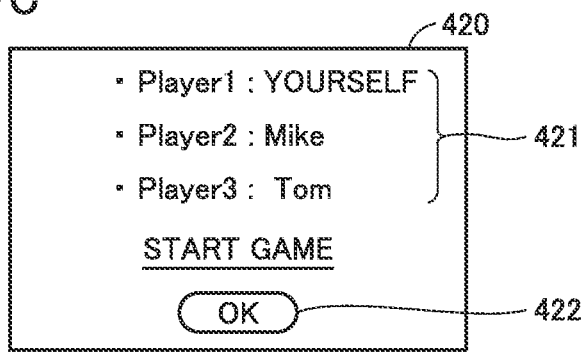
Figure 7D:
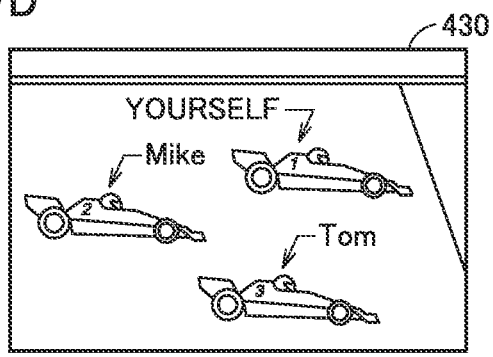

Choice item 404 is provided with a message "3. search for game being played." When this choice item is selected, the information processing apparatus functions as the client or the audience. "(2) Instruction to participate in game" or "(3)

instruction to participate as audience" shown in FIG. 6 is given to the information processing apparatus. In this case, screens as shown in FIGS. 8A to 8D are successively shown.

When choice item 403 is selected in menu screen 400 shown in FIG. 7A, the information processing apparatus functions as the master and a notification message is transmitted to other information processing apparatuses ("notification message" in FIG. 6). Then, in information processing apparatus 100 functioning as the master, a status screen 410 shown in FIG. 7B is shown on display 114. In status screen 410, users 411 and 412 who have selected participation in the game are shown in a list.

After a prescribed period has elapsed since transmission of the notification message to other information processing apparatuses or when the number of participating users has reached a predetermined number, a confirmation screen 420 shown in FIG. 7C is shown on display 114. In confirmation screen 420, names 421 of users who participate in the game are shown and a confirmation message such as "start game . . . " is shown. When the user of information processing apparatus 100 functioning as the master selects a confirmation button 422, the game in which a plurality of users are participating is started. A game progress screen 430 as shown in FIG. 7D is shown on each information processing apparatus which has participated in the game.

Figure 8A:
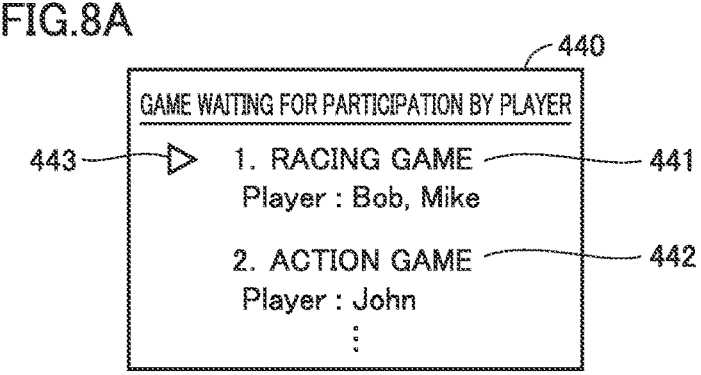
FIGS. 8A to 8D and 9 show exemplary illustrative non-limiting drawings illustrating user interface screen examples provided on the information processing apparatus in which a game program or an interface program has been installed.

When choice item 404 is selected in menu screen 400 shown in FIG. 7A, the information processing apparatus functions as the client or the audience and a status screen 440 shown in FIG. 8A is shown on display 114. In status screen 440, games 441 and 442 inviting participants are shown in a list. A user operates a cursor 443 to select a game in which the user desires to participate.

In status screen 440, detailed information on a game inviting participants (for example, a title of the game or description of game contents) may be included. A name of a user who has currently participated in the game may also be shown.

Figure 8B:
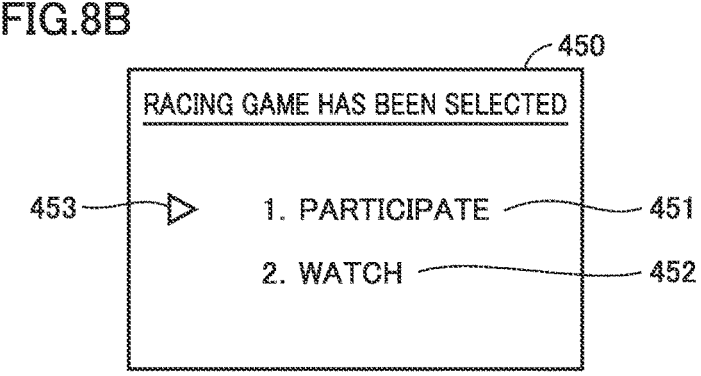

When any game is selected in status screen 440 shown in FIG. 8A, a selection screen 450 shown in FIG. 8B is shown on display 114. In selection screen 450, a choice item 451 "1. participate" and a choice item 452 "2. watch" are shown.

When a user operates a cursor 453 to select choice item 451, the information processing apparatus functions as the client. "(2) Instruction to participate in game" shown in FIG. 6 is given to the information processing apparatus.

When a user operates cursor 453 to select choice item 452, the information processing apparatus functions as the audience. "(3) Instruction to participate as audience" shown in FIG. 6 is given to the information processing apparatus.

Figure 8C:
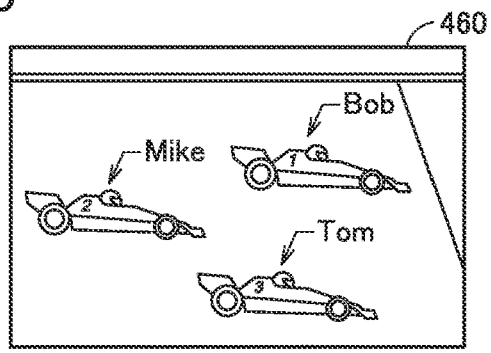

When any choice item is selected in selection screen 450 shown in FIG. 8B, a game progress screen 460 as shown in FIG. 8C is shown on the display. Game progress screen 460 is generated by information processing apparatus 100 functioning as the master. In information processing apparatus 200 (client) in which the user participates in the game as a player, an operation by the user is activated.

Figure 8D:
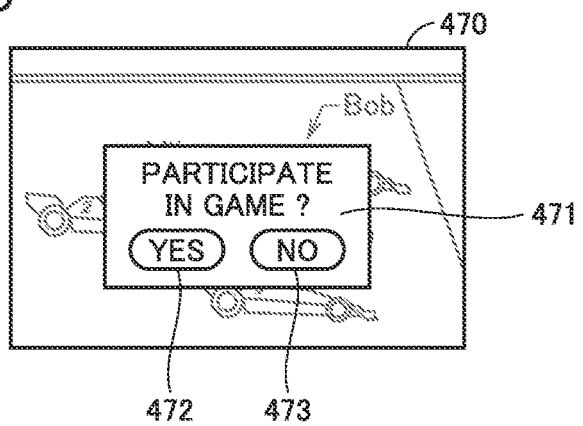

In contrast, in information processing apparatus 300 (audience) in which the user watches the game, an operation by the user is inactivated. In response to a prescribed operation by the user, a selection screen 470 shown in FIG. 8D is shown on the display. In selection screen 470, together with a message "participate in game?", a "YES" button 472 and a "NO" button 473 are shown. When the user selects "YES" button 472, the user can participate in the game. "(4) Instruction to participate in game" shown in FIG. 6 is given to the information processing apparatus. The information processing apparatus is thus switched from the audience to the client. The information processing apparatus activates a function to transmit operation information accepted by operation portion 116 of information processing apparatus 300 to information processing apparatus 100 in response to an operation accepted by operation portion 116 of information processing apparatus 300 while an application image is shown on display 114. Information processing apparatus 100 continues to show the application image even after activation of transmission of operation information to information processing apparatus 100.

Figure 9:
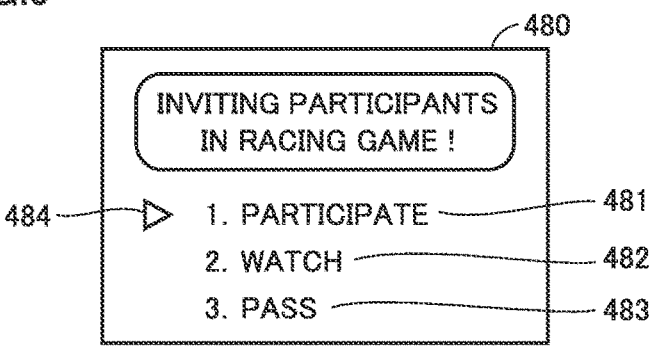

In an information processing apparatus which has received the notification message from information processing apparatus 100 functioning as the master, a notification screen 480 as shown in FIG. 9 is shown on display 114. On notification screen 480, together with a message inviting participants in the game, a choice item 481 "1. participate", a choice item 482 "2. watch", and a choice item 483 "3. pass" are shown.

When a user operates a cursor 484 to select choice item 481, the information processing apparatus functions as the client. "(2) Instruction to participate in game" shown in FIG. 6 is given to the information processing apparatus. When the user operates cursor 484 to select choice item 482, the information processing apparatus functions as the audience. "(3) Instruction to participate as audience" shown in FIG. 6 is given to the information processing apparatus.

In contrast, when a user operates cursor 484 to select choice item 483, the information processing apparatus does not become any of the client and the audience.

[G. Notification Function]

A notification function to transmit a notification message from the master will now be described. The notification message is transmitted from information processing apparatus 100 functioning as the master and serves to have information processing apparatus 200 start transmission of operation information to information processing apparatus 100. It is a message inviting a user who operates an information processing apparatus other than information processing apparatus 100 functioning as the master to establish connection to the master. The notification message is typically transmitted from information processing apparatus 100 at any timing as a beacon.

(g1: Reception Side of Notification Message)

When an information processing apparatus other than information processing apparatus 100 functioning as the master receives a notification message, it performs processing for having a user recognize reception of the notification message. For example, any method such as vibrating a main body or a part thereof, causing an indicator to blink or turning on the indicator, or generating prescribed voice and sound from the speaker, can be adopted. The user can know that there is a game which can be played or watched in the surroundings through an action of the information processing apparatus associated with reception of the notification message. Typically, a user who carries an information processing apparatus notices some kind of a notification action, has the information processing apparatus recover from a low power consumption state (or a sleep state), and can enjoy playing or watching the game.

(g2: Given Message)

One example of a data structure of a beacon used in information processing system 1 according to the present embodiment will be described with reference to FIG. 10. A beacon 500 corresponding to a management frame includes, for example, a sender address 502, a basic service set identifier (BSSID) 504, a game ID 506, the number of connections 508, the maximum number of connections 510, a list of established connections 512, and a watch permission flag 514.

Sender address 502 includes a media access control (MAC) address or an Internet protocol (IP) address of information processing apparatus 100 functioning as the master which is the sender of beacon 500. BSSID 504 includes an identifier on a radio network of information processing apparatus 100 functioning as the master which is the sender of beacon 500. Game ID 506 includes identification information for specifying a game inviting participants. The number of connections 508 indicates the number of current participants in a game inviting participants. The maximum number of connections 510 indicates the maximum number of participants allowed to participate in a game inviting participants. List of established connections 512 includes information for specifying an information processing apparatus connected to information processing apparatus 100 functioning as the master. Watch permission flag 514 includes a flag as to whether or not to permit participation in a game inviting participation as the audience.

By adopting such a beacon, processing for transmitting a notification message for inviting participation by users can readily be performed.

As described above, an information processing apparatus which has received a notification message has the main body or a part thereof vibrate, so that a user who carries the information processing apparatus is notified of reception of the notification message. The notification message is a trigger for generating vibration in a destination information processing apparatus. Thus, remote output module 174 of information processing apparatus 100 transmits, in addition to an application image, vibration data generated through application processing to information processing apparatus 200 functioning as the client.

The notification message may include any information. For example, though beacon 500 shown in FIG. 10 includes only game ID 506, further detailed information on a game inviting participants may be included. For example, the notification message may include a title of a game, description of game contents, a name of a character which appears in the game, a current state value of the game (a power gauge, a level of each character, or the number of remaining characters), comments from a participant or an expected participant, rating from past participants, and an item and a character which can be used in the game.

The notification message may include not only contents of the game inviting participants but also any information. For example, when a new application (game) is released, an advertisement message may be included together with an image showing contents thereof. The notification message may include advertisement information. Alternatively, while a game proceeds, a message to the effect that watch is invited because the game is in progress may be included.

Since information processing apparatus 100 functioning as the master can thus transmit a notification message at any timing, it can distribute messages in various applications to other information processing apparatuses which can communicate with information processing apparatus 100 through a radio signal. Timing to transmit a notification message may randomly be determined, or a notification message may be transmitted with approach by a new information processing apparatus to information processing apparatus 100 functioning as the master being regarded as an event.

As will be described later, a beacon can be transmitted over wireless LAN or Bluetooth™ Low Energy (BLE). Such a beacon can preferably be received regardless of a situation of an information processing apparatus. Therefore, the information processing apparatus according to the present embodiment is configured to be able to receive a notification message transmitted from information processing apparatus 100 functioning as the master even when a specific application is not being executed.

Which communication scheme is to be employed is determined depending on hardware of an information processing apparatus functioning as the client or the audience. A scheme for communication of a notification message transmitted from information processing apparatus 100 functioning as the master may be different depending on a type of an information processing apparatus functioning as the client or the audience.

(g3: Filtering of Notification Message)

A notification message may be transmitted at any timing from the master. A user who receives such a notification message may desire reception only of a notification message from a specific sender. In this case, an information processing apparatus functioning as the client or the audience is configured to activate only a notification message satisfying a predetermined condition among notification messages transmitted from information processing apparatus 100 functioning as the master.

Specifically, a function to filter a notification message as will be described below is preferably mounted. For such a filtering function, a method of including specific identification information in a transmitted notification message and/or a method of identifying a notification message to be received on a reception side are assumed.

For example, in the method of including specific identification information in a transmitted notification message, a keyword or a test word necessary for opening a notification message may be set in advance and only a user who knows the keyword or the test word can open the notification message. Alternatively, a notification message may be transmitted as being encrypted with a certain encryption key and only a user who has a corresponding decryption key in advance can decrypt the notification message.

By thus adding information shared among specific users to a notification message, such a situation that contents of a notification message are leaked to a third party can be prevented.

In the method of identifying a notification message to be received on a reception side, contents of the notification message may be shown only when the identification information included in the notification message match with identification information of a user registered in advance (for example, a user in friend relation or a user registered in an address book).

Alternatively, a sender from which a user on a reception side can receive a message may explicitly be set, or a condition for reception in connection with contents or an attribute included in a notification message may be set in advance.

By thus making filtering setting on the reception side, reception of an unnecessary notification message not desired by a user on the reception side can be suppressed.

(g4: Wireless LAN)

Figure 10:
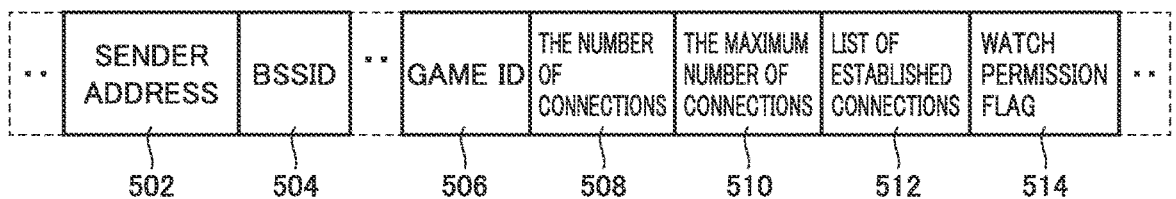
FIG. 10 shows an exemplary illustrative non-limiting drawing illustrating a data structure of a beacon used in the information processing system according to an embodiment.

When wireless LAN under 802.11 standards is employed for radio communication unit 120 (FIG. 2), a beacon as shown in FIG. 10 can be transmitted together with an action frame. The action frame represents one type of a management frame, and is used for triggering execution of some kind of a designated action (processing). By describing specific processing in this action frame, an information processing apparatus which can establish radio communication with information processing apparatus 100 functioning as the master can perform designated processing.

The action frame can be received as an event even when an information processing apparatus is in a low power consumption state (for example, in a sleep state or a stand-by state) so long as a physical layer and a data link layer of radio communication unit 120 which provides a wireless LAN interface are active. Even when an information processing apparatus is executing some kind of application, it can also receive an action frame in the background.

A frequency in a 2.4 GHz band and a 5 GHz band is currently allocated to wireless LAN under 802.11 standards, and the information processing apparatus according to the present embodiment can use both of these two frequency bands. There is a case that the 2.4 GHz band and the 5 GHz band cannot simultaneously be used because of hardware restrictions, and in such a case, a frequency band to be used is preferably switched as appropriate.

Figure 11:
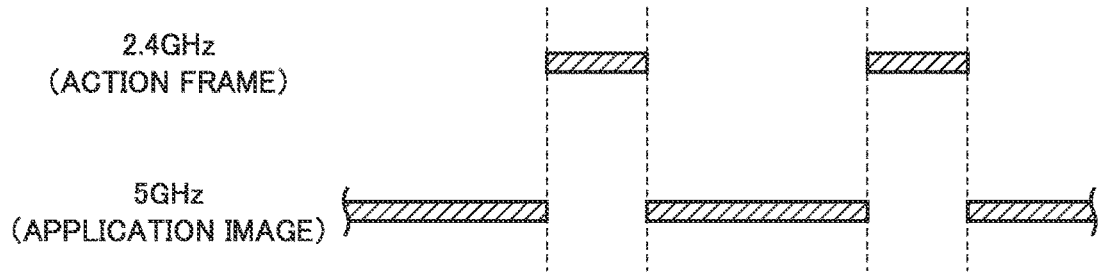
FIG. 11 shows an exemplary illustrative non-limiting drawing illustrating switching between frequency bands used in wireless LAN in the information processing apparatus according to the present embodiment.

One example of processing for switching between frequency bands used for wireless LAN in the information processing apparatus according to the present embodiment will be described with reference to FIG. 11. For example, an action frame is transmitted in the 2.4 GHz band and an application image relatively large in data capacity is transmitted in the 5 GHz band.

Information processing apparatus 100 functioning as the master is configured to transmit an application image and a notification message in different frequency bands. In such a case, an information processing apparatus functioning as the client or the audience receives an application image and receives a notification message by sequentially switching between the frequency bands in which radio communication unit 120 effectively communicates.

More specifically, the information processing apparatuses functioning as the client and the audience mainly communicate in the 5 GHz band for reception of an application image, however, they receive a frame transmitted in the 2.4 GHz band every prescribed period or every prescribed event in order to check whether or not there is an action frame.

By communicating over wireless LAN while switching between such frequency bands is made, an action frame can also be searched for and received while an application image necessary for representation on a display is received.

Alternatively, two types of information can selectively be received through different channels included in the same frequency band. For example, an application image may be received through a communication channel 1 in a certain frequency band and an action frame may be received through a communication channel 2 in that frequency band. In this case, channels included in the same frequency band are alternately activated, so that an action frame can also be searched for and received while an application image necessary for representation on a display is received.

Since a dedicated instruction can be embedded in an action frame adapted to wireless LAN as described above, information processing apparatus 100 configuring information processing system 1 can perform more suitable processing.

(g5: Bluetooth™ Low Energy (BLE))

When Bluetooth™ is employed for the radio communication unit (FIG. 2), Bluetooth™ Low Energy (BLE) defined under Bluetooth™ 4.0 standards is used for transmission of a beacon as shown in FIG. 10. By employing BLE, a beacon can be transmitted with lower power consumption than in wireless LAN.

By employing BLE as described above, a beacon can be exchanged among a plurality of types of information processing apparatuses which are different in hardware.

When a certain information processing apparatus functions as the client or the audience in response to transmission and reception of a notification message over BLE, it receives an application image and audio data transmitted over wireless LAN. Though a scheme for communication of a notification message may be different depending on a type of an information processing apparatus, once connection is established, information processing apparatus 100 functioning as the master transmits an application image and audio data under the same communication scheme after the notification message is transmitted.

[H. Processing Procedure]

A procedure of processing in each information processing apparatus configuring information processing system 1 according to the present embodiment will now be described.

(h1: Information Processing Apparatus Functioning as Master)

Figure 12:
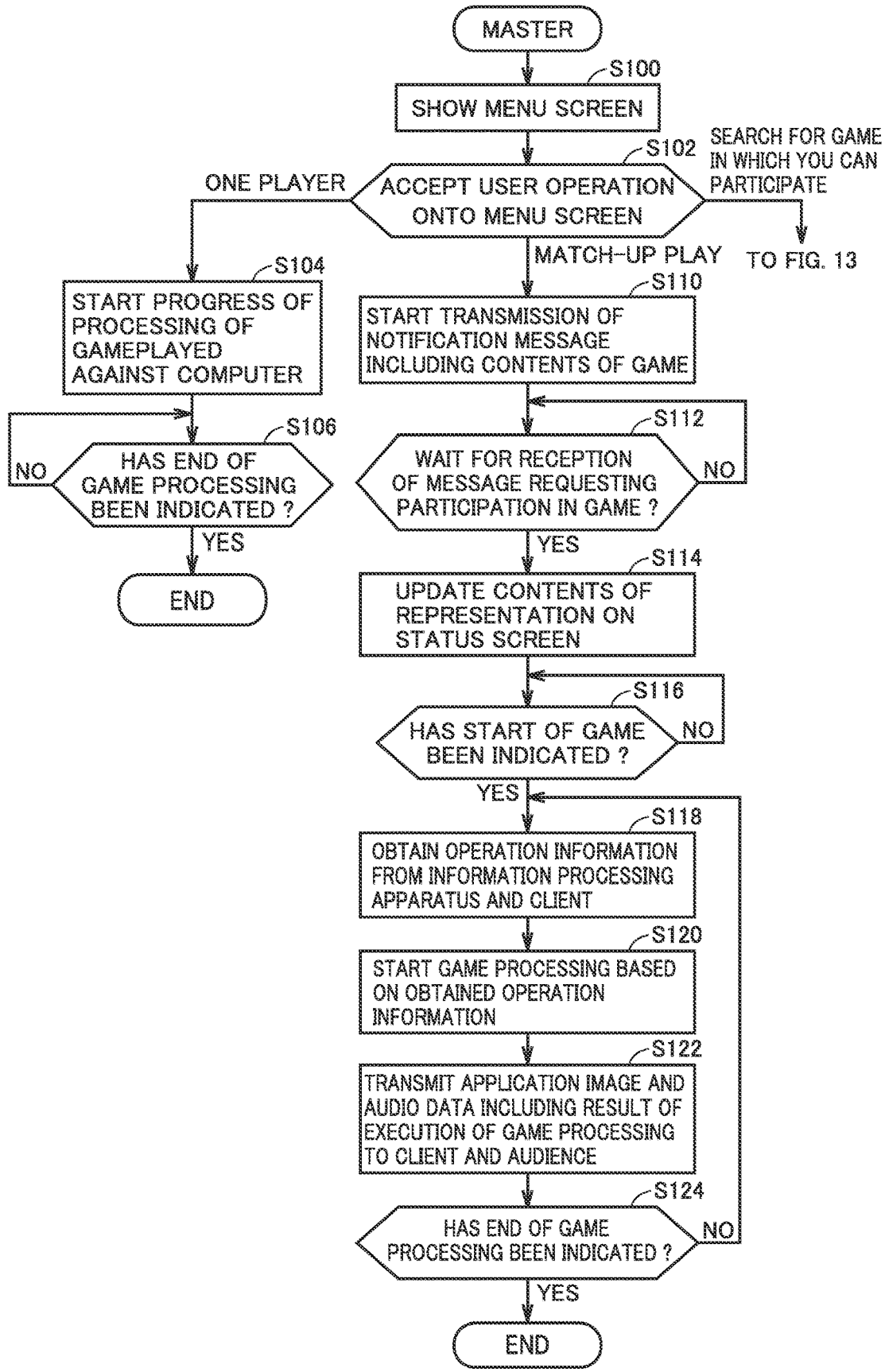
FIG. 12 shows an exemplary illustrative non-limiting drawing illustrating a flowchart showing a procedure of processing in the information processing apparatus in which the game program has been installed according to the present embodiment.

FIG. 12 shows a flowchart showing a procedure of processing in information processing apparatus 100 in which game program 140 has been installed according to the present embodiment. Each step shown in FIG. 12 is typically implemented by execution of game program 140 by processor 102.

Referring to FIG. 12, in response to an operation by a user, information processing apparatus 100 shows menu screen 400 as shown in FIG. 7A on display 114 (step S100) and accepts an operation by the user onto menu screen 400 (step S102).

When choice item 402 "1. one player" is selected on menu screen 400 ("one player" in step S102), information processing apparatus 100 starts progress of processing of a game played against the computer (step S104). Thereafter, information processing apparatus 100 determines whether or not end of game processing has been indicated (step S106). When end of game processing has not been indicated (NO in step S106), processing in step S106 and later is repeated. When end of game processing is indicated (YES in step S106), game processing ends.

When choice item 402 "2. match-up play" is selected on menu screen 400 ("match-up play" in step S102), information processing apparatus 100 starts the function as the master. Information processing apparatus 100 starts transmission of a notification message including contents of the game executed based on game program 140 (step S110), and waits for reception of a message requesting participation in the game from any information processing apparatus (step S112). When information processing apparatus 100 receives a message requesting participation in the game (YES in step S112), information processing apparatus 100 updates contents of representation on status screen 410 shown in FIG. 7B (step S114). Then, information processing apparatus 100 determines whether or not start of the game has been indicated (step S116). Information processing apparatus 100 determines whether or not confirmation button 422 has been selected in confirmation screen 420 shown in FIG. 7C. When start of the game has not been indicated (NO in step S116), processing in step S116 is repeated.

When start of the game has been indicated (YES in step S116), information processing apparatus 100 obtains operation information from information processing apparatus 100 itself and one client or a plurality of clients (step S118) and starts game processing based on the obtained operation information (step S120). Then, information processing apparatus 100 transmits an application image and audio data including a result of execution of game processing to the client and the audience (step S122).

Thereafter, information processing apparatus 100 determines whether or not end of game processing has been indicated (step S124). When end of game processing has not been indicated (NO in step S124), processing in step S118 and later is repeated. When end of game processing has been indicated (YES in step S124), the game processing ends.

Figure 13:
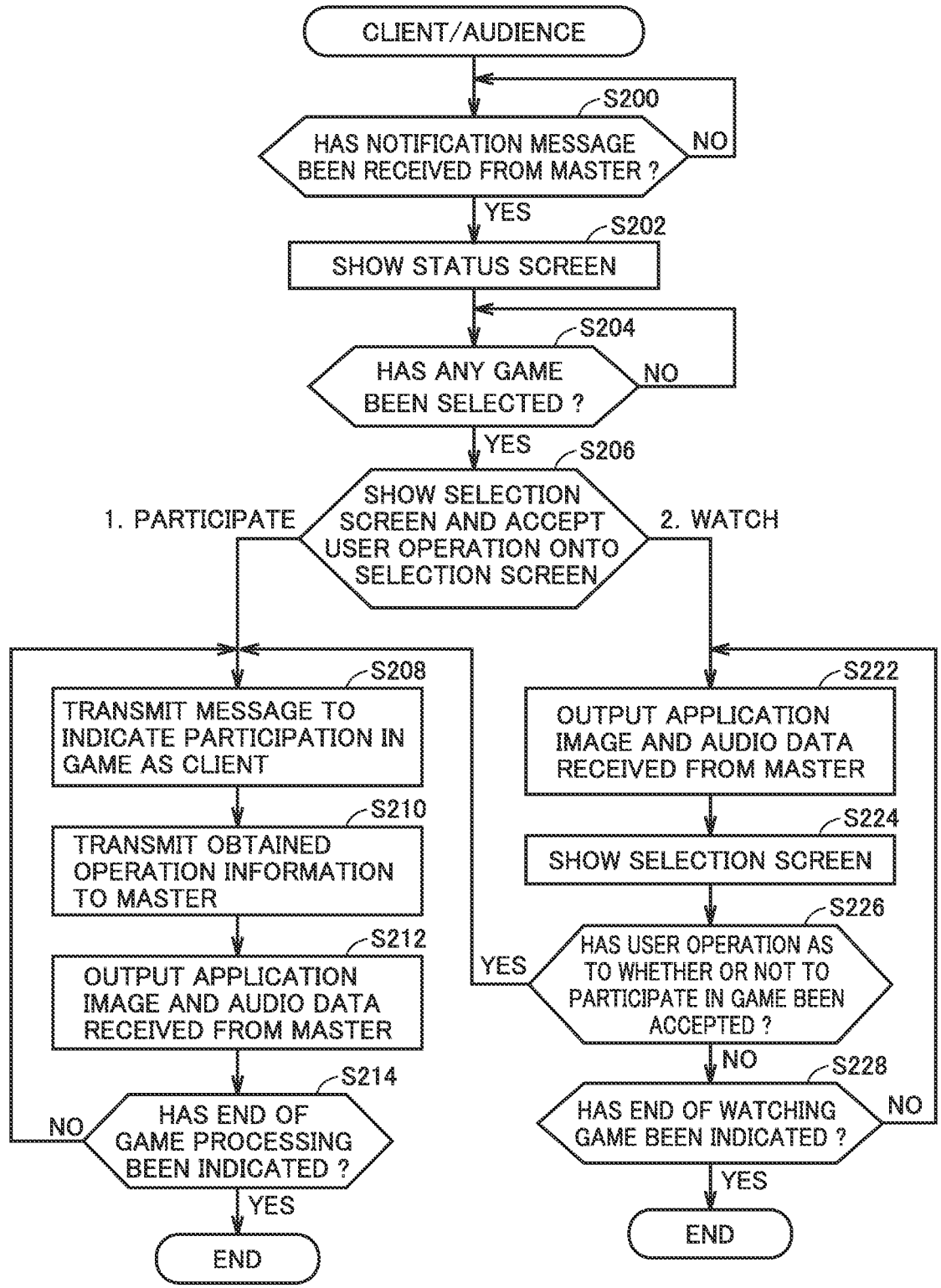
FIG. 13 shows an exemplary illustrative non-limiting drawing illustrating a flowchart showing a procedure of processing in the information processing apparatus in which the interface program has been installed.

When choice item 403 "3. search for game being played" is selected on menu screen 400 ("search for game in which you can participate" in step S102), processing shown in FIG. 13 is performed.

(h2: Information Processing Apparatus Functioning as Client/Audience)

FIG. 13 shows a flowchart showing a procedure of processing in information processing apparatuses in which interface programs 240 and 340 have been installed according to the present embodiment. Each step shown in FIG. 13 is typically implemented by execution of interface programs 240 and 340 by processor 102.

Referring to FIG. 13, information processing apparatuses 200 and 300 determine whether or not they have received a notification message from any information processing apparatus 100 functioning as the master (step S200). When a notification message has not been received (NO in step S200), processing in step S200 is repeated.

When information processing apparatuses 200 and 300 have received a notification message (YES in step S200), information processing apparatuses 200 and 300 show status screen 440 shown in FIG. 8A on display 114 (step S202). Information processing apparatuses 200 and 300 determine whether or not any game has been selected (step S204). When any game has been selected (YES in step S204), information processing apparatuses 200 and 300 show selection screen 450 and accept an operation by a user onto selection screen 450 (step S206).

When choice item 451 "1. participate" is selected on selection screen 450 ("participate" in step S206), information processing apparatus 200 directly transmits a message indicating participation in the game as the client to information processing apparatus 100 functioning as the master (step S208). Then, when the game is started, information processing apparatus 200 obtains operation information in accordance with an operation by the user which has been accepted by operation portion 116 and directly transmits the obtained operation information to information processing apparatus 100 functioning as the master (step S210). Information processing apparatus 200 outputs an application image and audio data received from information processing apparatus 100 functioning as the master (step S212). Thereafter, information processing apparatus 200 determines whether or not end of game processing has been indicated (step S214). When end of game processing has not been indicated (NO in step S214), processing in step S208 and later is repeated. When end of game processing has been indicated (YES in step S214), game processing ends.

When choice item 452 "2. watch" is selected on selection screen 450 ("watch" in step S202), information processing apparatus 300 outputs an application image and audio data received from information processing apparatus 100 functioning as the master after the game is started (step S222). Information processing apparatus 300 shows on display 114, selection screen 470 shown in FIG. 8D in response to an operation by the user (step S224) and accepts an operation by the user as to whether or not to participate in the game (step S226). When participation in the game is indicated by the user (YES in step S226), the information processing apparatus functions as the client and processing in step S208 and later is performed. When participation in the game has not been indicated by the user (NO in step S226), information processing apparatus 200 determines whether or not end of watch of the game has been indicated (step S228). When end of watch of the game has not been indicated (NO in step S228), processing in step S222 and later is repeated. When end of watch of the game has been indicated (YES in step S228), the function as the audience ends.

[I. Approval of Participation by User]

In information processing system 1 according to the present embodiment, information processing apparatus 100 functioning as the master invites participation in the game and users who desire participation in response thereto will participate in the game. Though the feature to invite many users to participate in the game is preferred from a point of view of a lower barrier to users who can participate in the game, it does not fulfill such needs as desire to enjoy a game only among specific members. In such a case, the master user may be able to determine whether or not to approve a user who desires participation.

Figure 14:
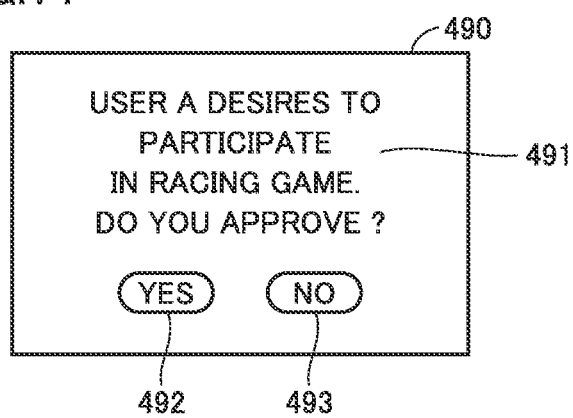
FIG. 14 shows an exemplary illustrative non-limiting drawing illustrating a user interface screen example provided on the information processing apparatus functioning as a master.

FIG. 14 shows a user interface screen example provided on an information processing apparatus functioning as the master. Referring to FIG. 14, when a request indicating desire to participate in a game from any information processing apparatus is received, an approval screen 490 as shown in FIG. 14 is shown on display 114 of information processing apparatus 100 functioning as the master. Approval screen 490 shows a message 491 including information on a user who desires participation in the game and a "YES" button 492 and a "NO" button 493. When the master user selects "YES" button 492, the user who desires participation can participate in the game. When the master user selects "NO" button 493, participation in the game by the user who desires participation is rejected.

Thus, information processing apparatus 100 functioning as the master determines whether or not to permit transmission of operation information to information processing apparatus 100 by a certain information processing apparatus in response to an operation by a user, that is, connection as the client.

By adopting such processing, such needs as desire to enjoy a game only among specific members can be fulfilled.

[J. Transmission of Application Image and Audio Data]

In information processing system 1 according to the present embodiment, an application image and audio data are transmitted from information processing apparatus 100 functioning as the master to one information processing apparatus or a plurality of information processing apparatuses. A form as below may be adopted for processing for transmitting an application image and audio data.

(j1: Batch Transmission of Multiple Screens)

When a plurality of users participate in a common game, depending on a type of a game, such a form as providing the same application image to all users may be adopted, or such a form as providing application images different for each user (information processing apparatus) may be adopted. Exemplary processing for providing application images different for each user (information processing apparatus) will be described below.

Application images different for each user (information processing apparatus) may include images generated for respective points of view of respective users arranged in a game space. Alternatively, even though a point of view is the same, representation in line with progress of a game such as a name of a character operated by each user or a power gauge is different for each user. A method of providing an application image specific for each user will be described.

Figure 15:
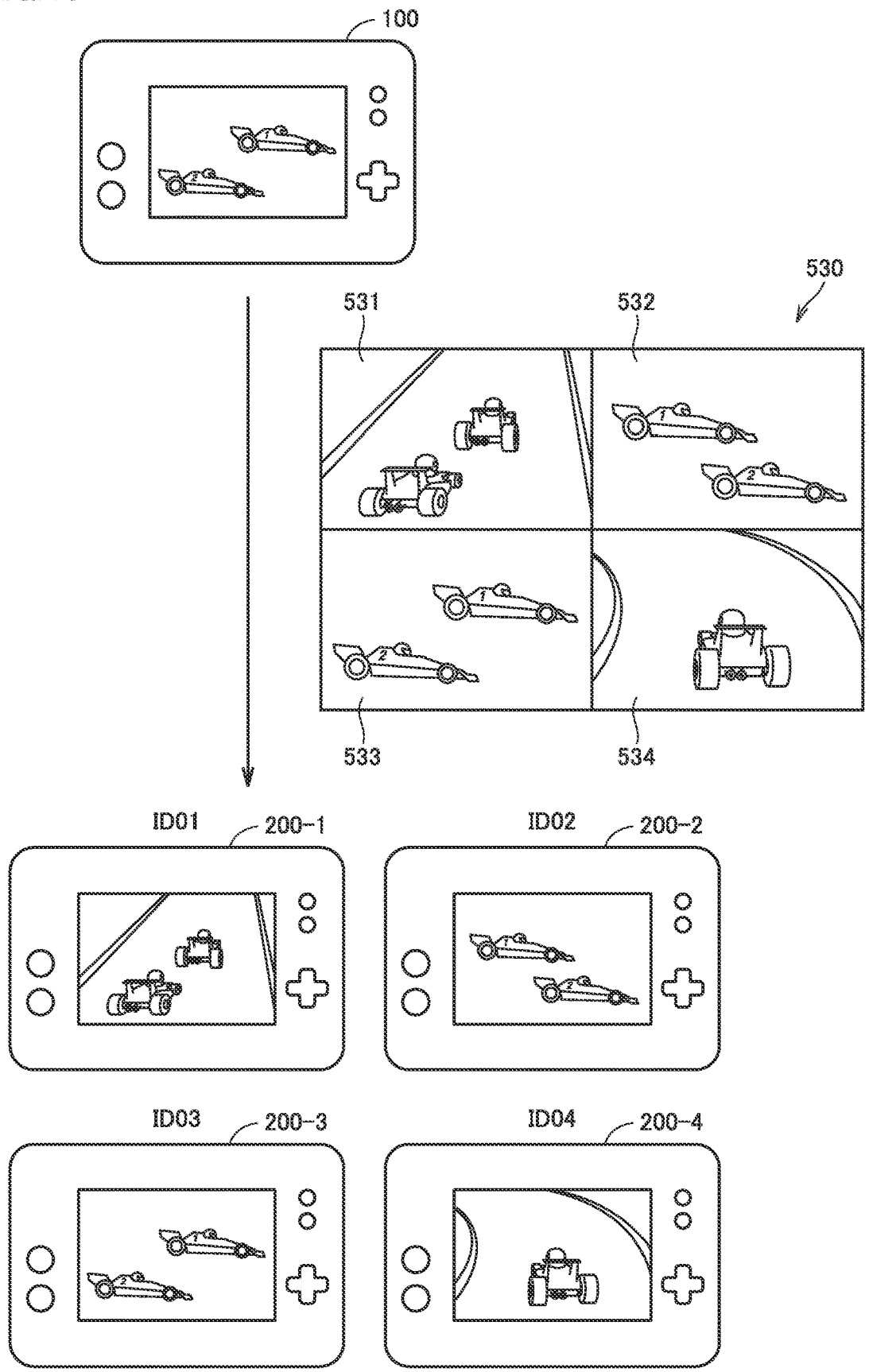
FIGS. 15 and 16A and 16B show exemplary illustrative non-limiting drawings illustrating a method of generating and transmitting an application image for each information processing apparatus in the information processing system according to the present embodiment.

A method of generating and transmitting an application image for each information processing apparatus in information processing system 1 according to the present embodiment will be described with reference to FIG. 15. FIG. 15 exemplifies a configuration in which four information processing apparatuses 200-1 to 200-4 function as the clients for information processing apparatus 100 functioning as the master.

As shown in FIG. 15, information processing apparatus 100 functioning as the master generates an application image 530 including application images directed to respective information processing apparatuses 200-1 to 200-4. Partial images 531 to 534 included in application image 530 correspond to application images directed to respective information processing apparatuses 200-1 to 200-4.

Information processing apparatuses 200-1 to 200-4 are provided in advance with respective pieces of identification information ID01 to ID04 each indicating which partial image included in application image 530 is to be shown. Each of information processing apparatuses 200-1 to 200-4 shows on the display, an image in a specific region (a partial image) of received application image 530, based on identification information provided in advance.

Thus, information processing apparatus 100 functioning as the master transmits an application image which is integration of application images generated for respective information processing apparatuses 200. Information processing apparatus 200 shows on display 114, an image corresponding to information processing apparatus 200 itself, of the integrated application image.

As shown in FIG. 15, by generating and transmitting an application image including a plurality of partial images to be shown on respective information processing apparatuses 200-1 to 200-4, versatility and zest of a game can be enhanced.

(j2: Time Division Transmission)

Instead of a form of transmission of an application image including a plurality of partial images as described above, an application image may be transmitted for each information processing apparatus 200 functioning as the client.

Figure 16A:
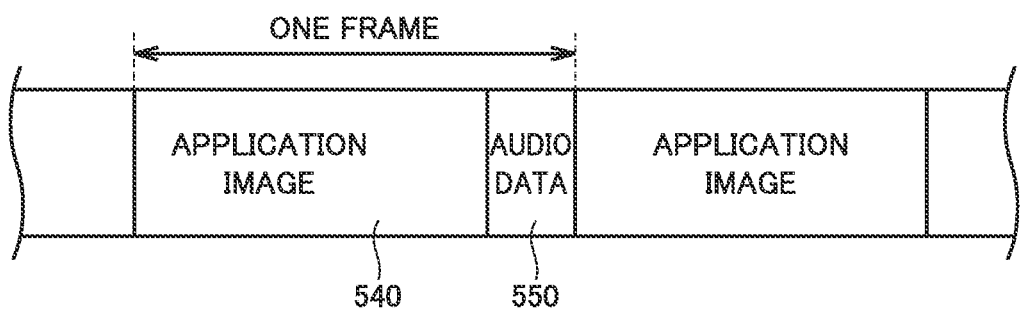
Figure 16B:
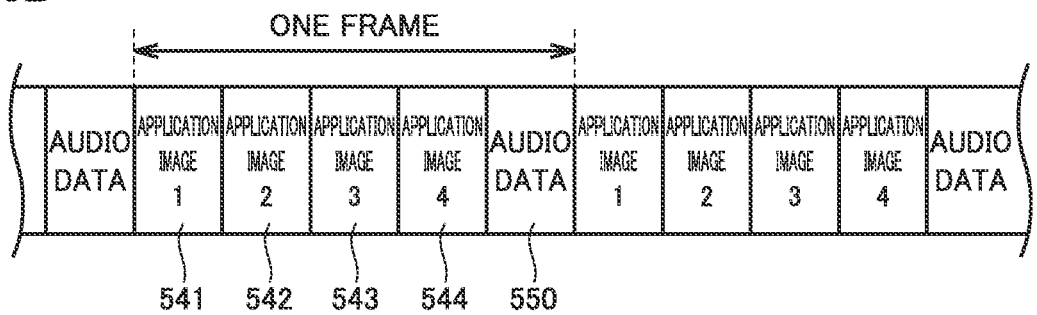

A method of generating and transmitting an application image for each information processing apparatus in information processing system 1 according to the present embodiment will be described with reference to FIGS. 16A and 16B. FIGS. 16A and 16B exemplify a configuration in which four information processing apparatuses 200-1 to 200-4 function as the clients for information processing apparatus 100 functioning as the master.

FIG. 16A shows a time chart corresponding to the transmission method as shown in FIG. 15 described above. Information processing apparatus 100 functioning as the master periodically transmits a set of one application image 540 and one piece of audio data 550 as one frame.

FIG. 16B shows a time chart corresponding to a time-division transmission method. Information processing apparatus 100 functioning as the master generates application images 541 to 544 for respective information processing apparatuses 200-1 to 200-4 functioning as the clients and transmits the application images in a prescribed order within each frame period. One frame also includes audio data in addition to application images 541 to 544.

Information processing apparatuses 200-1 to 200-4 are provided in advance with respective pieces of identification information ID01 to ID04 each indicating a position in one frame, of an application image to be extracted. Each of information processing apparatuses 200-1 to 200-4 extracts a specific application image in one received frame based on identification information provided in advance and shows the application image on the display.

By thus transmitting a plurality of application images in the prescribed order, each of the plurality of information processing apparatuses 200-1 to 200-4 can show an application image for each user. Versatility and zest of a game can thus be enhanced.

(j3: Optimization of Resolution)

Though an example in which information processing apparatuses substantially the same in hardware configuration function as clients has been described above, information processing apparatuses functioning as the clients may also be different in hardware specifications from one another. In this case, a resolution of an application image to be transmitted is preferably optimized.

Figure 17:
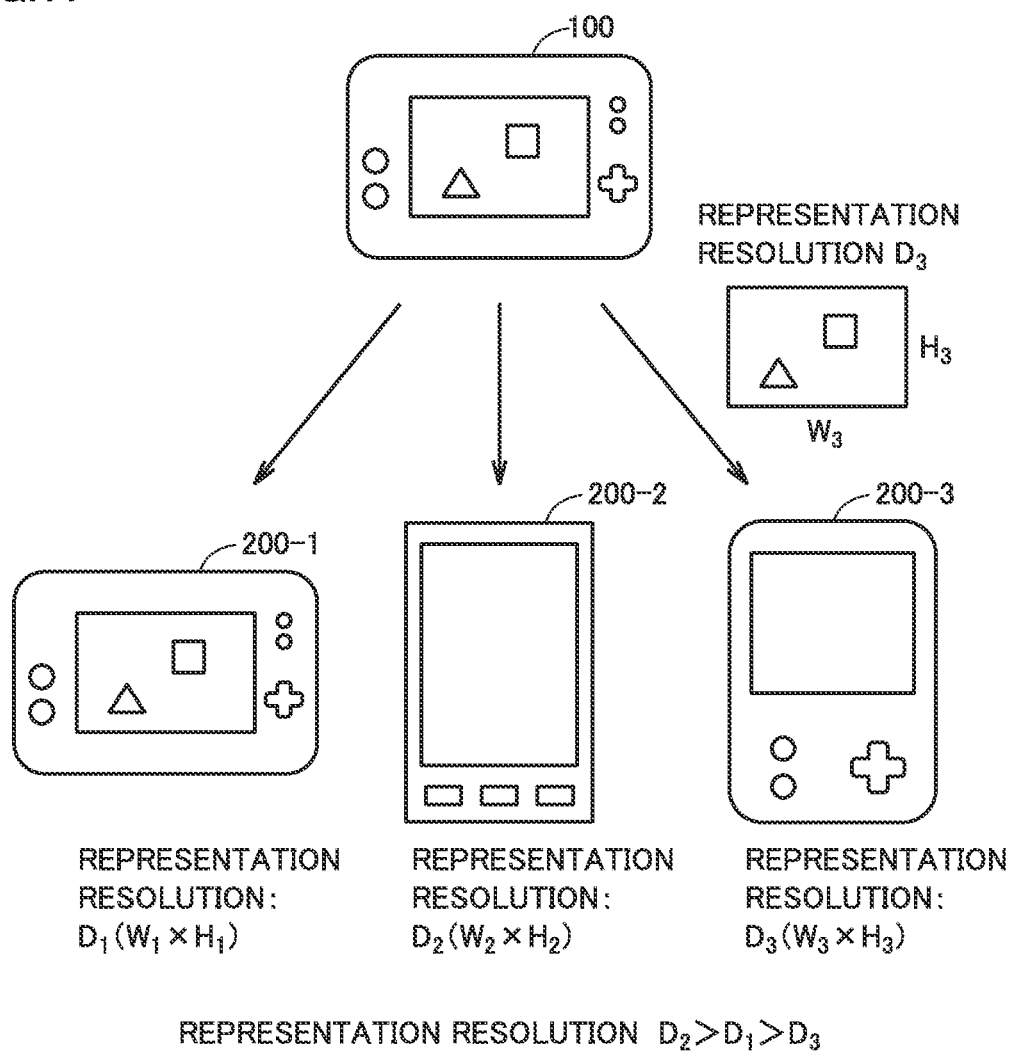
FIG. 17 shows an exemplary illustrative non-limiting drawing illustrating a method of optimizing a resolution of an application image for each information processing apparatus in the information processing system according to the present embodiment.

A method of optimizing a resolution of an application image for each information processing apparatus in information processing system 1 according to the present embodiment will be described with reference to FIG. 17. FIG. 17 exemplifies a configuration in which three information processing apparatuses 200-1 to 200-3 function as the clients for information processing apparatus 100 functioning as the master. It is assumed that information processing apparatuses 200-1 to 200-3 are different from one another in representation resolution.

For example, information processing apparatus 200-1 has a representation resolution D1 (W1×H1), information processing apparatus 200-2 has a representation resolution D2 (W2×H2), and information processing apparatus 200-3 has a representation resolution D3 (W3×H3). Information processing apparatus 200-3 is lowest in representation resolution D3 (lowest in specifications).

In such a case, information processing apparatus 100 functioning as the master may generate an application image so as to adapt to the lowest representation resolution. In this example, an application image having representation resolution D3 (W3×H3) is generated and transmitted to each client. Information processing apparatus 100 functioning as the master may convert an application image to a prescribed resolution and transmit the converted application image to information processing apparatus 200. Thus, regardless of a type of information processing apparatuses 200-1 to 200-3, an application image may be transmitted with a resolution being uniformly lowered. In contrast, application images having a plurality of types of resolutions may individually be generated in accordance with representation resolutions of information processing apparatuses 200-1 to 200-3.

As described above, since information processing apparatus 200 functioning as the client transmits operation information to information processing apparatus 100, it may transmit information on a maximal size of an image which can be shown on a mounted display, that is, a representation resolution, at the timing of transmission of the operation information.

Alternatively, information processing apparatus 200 functioning as the client may negotiate a representation resolution in a procedure for connection to information processing apparatus 100 functioning as the master.

By adopting such a configuration, even when a plurality of clients different in hardware specifications from one another participate in a game, a plurality of users can enjoy the game without awareness of differences in specifications.

To the contrary, information processing apparatus 100 functioning as the master may generate an application image in accordance with the highest representation resolution among a plurality of clients and transmit the application image. Each client reduces the received application image to a size of an image which can be shown and then shows the application image on the display.

By adopting such a configuration, a client higher in hardware specifications can enjoy video images in accordance with its specifications and even a client lower in hardware specifications can participate in a game.

(j4: Restriction of Destination of Application Image)

In information processing system 1 according to the present embodiment, information processing apparatus 100 functioning as the master transmits an application image in either broadcast or multicast. Therefore, basically, an apparatus capable of radio communication with information processing apparatus 100 functioning as the master can show an application image. Such a feature of ability to show an application image on any apparatus is preferred from a point of view of a lower barrier to users who can participate in a game, however, it does not fulfill such needs as desire to enjoy a game only among specific members. In such a case, such a scheme that only a specific information processing apparatus can show an application image may be adopted.

Figure 18:
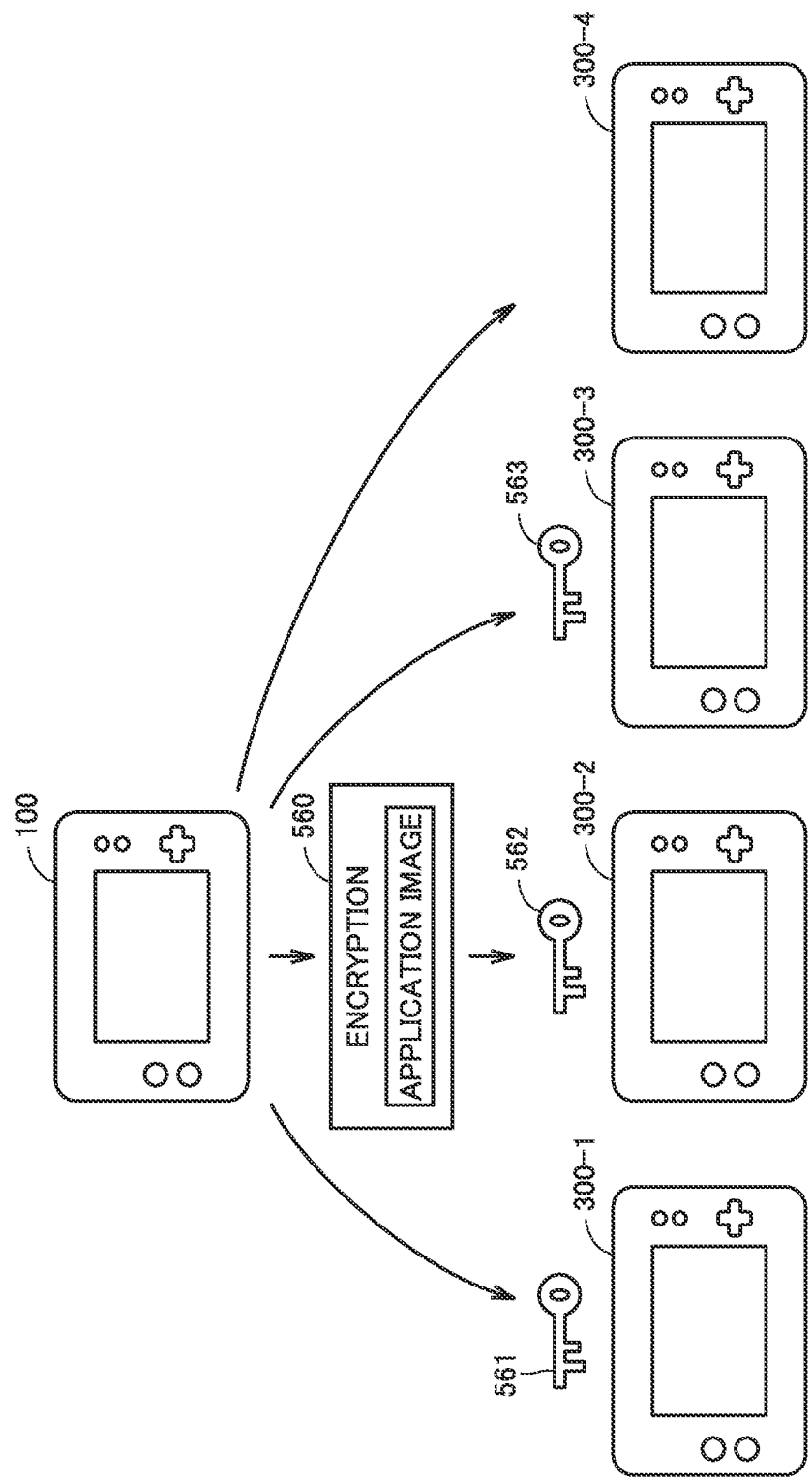
FIG. 18 shows an exemplary illustrative non-limiting drawing illustrating a method of restricting a transmission destination of an application image in the information processing system according to the present embodiment.

A method of restricting a destination of an application image in information processing system 1 according to the present embodiment will be described with reference to FIG. 18. In FIG. 18, in the method of restricting a destination of an application image, an application image 560 is encrypted and broadcast and decryption keys 561, 562, and 563 for decrypting application image 560 are distributed in advance only to information processing apparatus 300 permitted to show the application image.

In the configuration shown in FIG. 18, each of information processing apparatuses 300-1 to 300-4 receives encrypted application image 560 received from information processing apparatus 100 functioning as the master. Only information processing apparatuses 300-1 to 300-3 among information processing apparatuses 300-1 to 300-4 have respective decryption keys 561 to 563 and can decrypt the received application image. Thus, information processing apparatuses 300-1 to 300-3 show the application image. Since information processing apparatus 300-4 does not have a decryption key, it cannot decrypt the received application image.

Any method can be adopted as the method of distributing a decryption key in advance. For example, a decryption key may be distributed over a community network among users such as a social network (SNS). In this case, a set of an encryption key and a decryption key under a public encryption scheme may be made use of.

Alternatively, a decryption key may be obtained by accessing a site from which various programs including an interface program described above are downloaded on a chargeable or free-of-charge basis. Alternatively, an encryption key is distributed through a radio signal to game distributors or convenience stores and the encryption key may be obtained at such a location.

By restricting an information processing apparatus which can show an application image by using such an encryption key, only users in a closed user community can share and enjoy a game. By prohibiting obtainment of an encryption key at locations other than a specific location, a kind of rareness can be produced.

[K. Use of General-Purpose Device as Client/Audience]

In information processing system 1 according to the present embodiment, so long as game program 140 (FIG. 3) is executed in information processing apparatus 100 functioning as the master, an information processing apparatus functioning as the client or the audience should only perform processing involved with exchange with the master. The information processing apparatus functioning as the client or the audience performs only a relatively simple program. Therefore, any information processing apparatus capable of radio communication with information processing apparatus 100 functioning as the master can be employed as the client or the audience.

A smart device such as a smartphone or a tablet or a general-purpose device such as a personal computer can be employed as the client or the audience. In this case, an interface program for functioning as the client or the audience should be installed in the general-purpose device. Such an interface program should only be distributed and installed with a known method.

For example, an interface program may be distributed as being stored in such a storage medium as an optical disc, or stored in a distribution server and downloaded by accessing the distribution server.

A method of installing an interface program in a general-purpose device in information processing system 1 according to the present embodiment will be described with reference to FIGS. 19A and 19B.

Figure 19A:
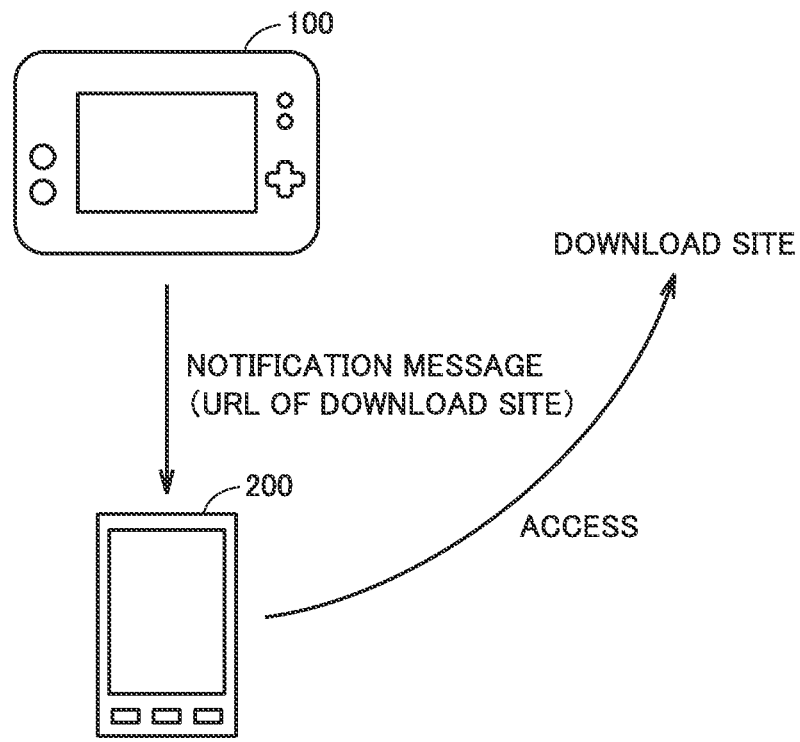
FIGS. 19A and 19B show exemplary illustrative non-limiting drawings illustrating a method of installing an interface program for a general-purpose device in the information processing system according to the present embodiment.

FIG. 19A shows a configuration example for including information for specifying a download site of an interface program in a notification message transmitted from information processing apparatus 100 functioning as the master. More specifically, information processing apparatus 100 transmits with any method, a notification message including a uniform resource locator (URL) indicating a download site of an interface program which can be used in information processing apparatus 200 representing a general-purpose device. When information processing apparatus 200 receives the notification message from the master, it shows contents thereof. A notification message may be transmitted with any method such as an electronic mail, short message service (SMS), and various message services.

When a user of information processing apparatus 200 indicates access to a URL included in the received notification message, information processing apparatus 200 accesses the designated download site and downloads and installs the designated interface program.

Through a series of such processes, even a user of a general-purpose device can readily participate in information processing system 1 in the present embodiment and a plurality of users can enjoy a game.

Figure 19B:
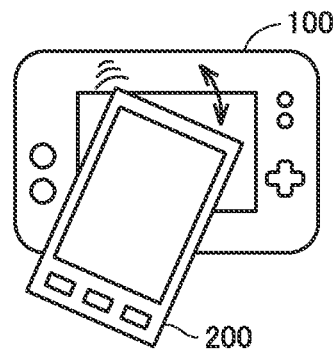

FIG. 19B shows a configuration example in which an interface program is downloaded to information processing apparatus 200 from information processing apparatus 100 functioning as the master through near field radio communication such as near field communication (NFC). More specifically, information processing apparatus 100 functioning as the master holds in advance one interface program or a plurality of interface programs for each OS of a general-purpose device. Information processing apparatus 100 and information processing apparatus 200 each have an NFC function, and when these apparatuses are brought closer to each other while the NFC function of these apparatuses are activated, an appropriate interface program is sent from information processing apparatus 100 to information processing apparatus 200 while they exchange information with each other.

Alternatively, information processing apparatus 100 may serve as an NFC tag with a card emulation function and information processing apparatus 200 as a reader-writer may read information (URL) on a tag from information processing apparatus 100.

A known method such as infrared communication, wireless LAN, and Bluetooth™ can be adopted for transmission of an interface program from information processing apparatus 100 to information processing apparatus 200, without being limited to NFC.

Through such a procedure, a user of information processing apparatus 200 can participate in a game provided by information processing apparatus 100 without much awareness of presence of an interface program.

[L. Use of General-Purpose Device as Master]

Though an example in which a general-purpose device is made use of as the client or the audience has been exemplified in the description above, a general-purpose device may be employed as the master. Though game program 140 executed in a general-purpose device should be prepared in this case, any type of information processing apparatus may be employed as an information processing apparatus to serve as the client or the audience.

[M. Modification]

A modification as below may be adopted in the embodiment described above.

Information processing apparatus 100 functioning as the master may transmit a common application image to a plurality of information processing apparatuses 200 functioning as the clients (and information processing apparatus 300 functioning as the audience). In contrast, information processing apparatus 100 functioning as the master may transmit individual application images to a plurality of information processing apparatuses 200 functioning as the clients (and information processing apparatus 300 functioning as the audience), respectively.

Furthermore, the two transmission methods described above may be combined with each other. In this case, information processing apparatus 200 functioning as the client may show the received common application image and the individual application image as being combined with each other. In a more specific application example, an individual application image may be an image of a common game field and an individual application image may be an image of a name of a character associated with a user who operates each of a plurality of information processing apparatuses 200, a power gauge, and a group of items which are being held.

A common application image and individual application images may simultaneously be transmitted in broadcast (or multicast). Alternatively, a common application image may be transmitted in broadcast (or multicast), whereas an individual application images may individually be transmitted in unicast to target information processing apparatuses 200.

By adopting combination of such a common application image and an individual application image, in spite of restriction of throughput, a screen for each of the plurality of users can be provided while redundant data transmission is suppressed.

[N. Advantages]

In information processing system 1 according to the present embodiment, an information processing apparatus functioning as the master should only be able to use a game program and other information processing apparatuses should only be able to use a simple program for exchange with the information processing apparatus functioning as the master. In the present embodiment, restriction associated with hardware necessary for a plurality of users to enjoy the same game can be relaxed.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing system comprising:
a first information processing apparatus; and
a second information processing apparatus,
each of the first information processing apparatus and the second information processing apparatus comprising a display, a controller, and a radio transceiver,
the second information processing apparatus comprising processing circuitry configured to directly transmit operation information accepted by the controller of the second information processing apparatus to the first information processing apparatus through the radio transceiver,
the first information processing apparatus comprises processing circuitry configured to:
perform application processing based on operation information accepted by the controller of the first information processing apparatus and the operation information from the second information processing apparatus,
generate an application image including a result of execution of the application processing and show the application image on the display of the first information processing apparatus, and
directly transmit the application image to the second information processing apparatus through the radio transceiver of the first information processing apparatus, and
the processing circuitry of the second information processing apparatus is further configured to show the application image from the first information processing apparatus on the display of the second information processing apparatus, wherein
the application image, which is transmitted by the processing circuitry of the first information processing apparatus, is an integration of application images generated for respective second information processing apparatuses;
the processing circuitry of the second information processing apparatus is configured to show, on the display of the second information processing apparatus, an image in a region corresponding to the second information processing apparatus, of the integrated application image; and
the image in the region corresponding to the second information processing apparatus forms a partial image of the integrated application image.

2. The information processing system according to claim 1, wherein
the processing circuitry of the second information processing apparatus transmits the operation information to the first information processing apparatus in unicast.

3. The information processing system according to claim 1, wherein
the processing circuitry of the first information processing apparatus transmits the application image to the second information processing apparatus in either broadcast or multicast.

4. The information processing system according to claim 1, wherein
the processing circuitry of the first information processing apparatus transmits, in addition to the application image, audio data generated through the application processing to the second information processing apparatus.

5. The information processing system according to claim 1, wherein
the processing circuitry of the first information processing apparatus transmits, in addition to the application image, vibration data generated through the application processing to the second information processing apparatus.

6. The information processing system according to claim 1, wherein
the first information processing apparatus executes a game program, and
the second information processing apparatus executes a program simpler than the game program.

7. The information processing system according to claim 6, wherein
the simpler program is configured to be executable with any of a plurality of game programs.

8. The information processing system according to claim 6, wherein
the first information processing apparatus comprises a first storage memory for storing the game program, and
the second information processing apparatus comprises a second storage memory for storing the simpler program.

9. The information processing system according to claim 1, wherein
the processing circuitry of the first information processing apparatus converts the application image to a prescribed resolution and transmits the converted application image to the second information processing apparatus.

10. An information processing system comprising:
a first information processing apparatus; and
a second information processing apparatus,
each of the first information processing apparatus and the second information processing apparatus comprising a display, a controller, and a radio transceiver,
the second information processing apparatus comprising processing circuitry configured to directly transmit operation information accepted by the controller of the second information processing apparatus to the first information processing apparatus through the radio transceiver,
the first information processing apparatus comprises processing circuitry configured to:
perform application processing based on operation information accepted by the controller of the first information processing apparatus and the operation information from the second information processing apparatus,
generate an application image including a result of execution of the application processing and show the application image on the display of the first information processing apparatus, and
directly transmit the application image to the second information processing apparatus through the radio transceiver of the first information processing apparatus, and
the processing circuitry of the second information processing apparatus is further configured to show the application image from the first information processing apparatus on the display of the second information processing apparatus,
the information processing system further comprising a third information processing apparatus, wherein
the third information processing apparatus comprises a display, a controller, and a radio transceiver, and
the third information processing apparatus comprises processing circuitry configured to inactivate transmission of operation information accepted by the controller of the third information processing apparatus to the first information processing apparatus but to show the application image from the first information processing apparatus on the display of the third information processing apparatus.

11. The information processing system according to claim 10, wherein
the processing circuitry of the third information processing apparatus activates transmission of the operation information accepted by the controller of the third information processing apparatus to the first information processing apparatus in response to an operation accepted by the controller of the third information processing apparatus while the display continues to show the application image.

12. The information processing system according to claim 11, wherein
the third information processing apparatus continues representation of the application image also after transmission of the operation information to the first information processing apparatus is activated.

13. The information processing system according to claim 1, wherein
the first information processing apparatus transmits a message for having the second information processing apparatus start transmission of the operation information to the first information processing apparatus.

14. An information processing system comprising:
a first information processing apparatus; and
a second information processing apparatus,
each of the first information processing apparatus and the second information processing apparatus comprising a display, a controller, and a radio transceiver,
the second information processing apparatus comprising processing circuitry configured to directly transmit operation information accepted by the controller of the second information processing apparatus to the first information processing apparatus through the radio transceiver,
the first information processing apparatus comprises processing circuitry configured to:
perform application processing based on operation information accepted by the controller of the first information processing apparatus and the operation information from the second information processing apparatus,
generate an application image including a result of execution of the application processing and show the application image on the display of the first information processing apparatus, and
directly transmit the application image to the second information processing apparatus through the radio transceiver of the first information processing apparatus, and
the processing circuitry of the second information processing apparatus is further configured to show the application image from the first information processing apparatus on the display of the second information processing apparatus, wherein
the first information processing apparatus is configured to transmit a message for having the second information processing apparatus start transmission of the operation information to the first information processing apparatus; and
the second information processing apparatus is configured to activate only a message satisfying a predetermined condition, among messages transmitted from the first information processing apparatus.

15. An information processing system comprising:
a first information processing apparatus; and
a second information processing apparatus,
each of the first information processing apparatus and the second information processing apparatus comprising a display, a controller, and a radio transceiver,
the second information processing apparatus comprising processing circuitry configured to directly transmit operation information accepted by the controller of the second information processing apparatus to the first information processing apparatus through the radio transceiver,
the first information processing apparatus comprises processing circuitry configured to:
  perform application processing based on operation information accepted by the controller of the first information processing apparatus and the operation information from the second information processing apparatus,
  generate an application image including a result of execution of the application processing and show the application image on the display of the first information processing apparatus, and
  directly transmit the application image to the second information processing apparatus through the radio transceiver of the first information processing apparatus, and
the processing circuitry of the second information processing apparatus is further configured to show the application image from the first information processing apparatus on the display of the second information processing apparatus, wherein
the first information processing apparatus is configured to transmit a message for having the second information processing apparatus start transmission of the operation information to the first information processing apparatus; and
the second information processing apparatus is configured to be able to receive a message transmitted from the first information processing apparatus while a specific application is not executed.

16. The information processing system according to claim 13, wherein
the first information processing apparatus is configured to transmit the application image and the message in frequency bands different from each other, and
the second information processing apparatus receives the application image and receives the message by sequentially switching between the frequency bands in which the radio transceiver effectively communicates.

17. The information processing system according to claim 13, wherein
the message transmitted from the first information processing apparatus includes advertisement information.

18. The information processing system according to claim 13, wherein
a scheme for communication of the message transmitted from the first information processing apparatus is different depending on a type of the second information processing apparatus.

19. The information processing system according to claim 18, wherein
the first information processing apparatus transmits the application image under an identical communication scheme after transmission of the message.

20. An information processing system comprising:
a first information processing apparatus; and
a second information processing apparatus,
each of the first information processing apparatus and the second information processing apparatus comprising a display, a controller, and a radio transceiver,
the second information processing apparatus comprising processing circuitry configured to directly transmit operation information accepted by the controller of the second information processing apparatus to the first information processing apparatus through the radio transceiver,
the first information processing apparatus comprises processing circuitry configured to:
  perform application processing based on operation information accepted by the controller of the first information processing apparatus and the operation information from the second information processing apparatus,
  generate an application image including a result of execution of the application processing and show the application image on the display of the first information processing apparatus, and
  directly transmit the application image to the second information processing apparatus through the radio transceiver of the first information processing apparatus, and
the processing circuitry of the second information processing apparatus is further configured to show the application image from the first information processing apparatus on the display of the second information processing apparatus, wherein
the first information processing apparatus transmits a message for having the second information processing apparatus start transmission of the operation information to the first information processing apparatus; and
the first information processing apparatus determines whether or not to permit transmission of the operation information to the first information processing apparatus by the second information processing apparatus in accordance with an operation by a user.

21. The information processing system according to claim 1, wherein
the radio transceiver establishes near field radio communication.

22. An information processing method in an information processing system comprising a first information processing apparatus and a second information processing apparatus, each of the first information processing apparatus and the second information processing apparatus comprising a display, a controller, and a radio transceiver, the information processing method comprising:
directly transmitting, at the second information processing apparatus, operation information accepted by the controller of the second information processing apparatus to the first information processing apparatus through the radio transceiver;

performing, at the first information processing apparatus, application processing based on operation information accepted by the controller of the first information processing apparatus and the operation information from the second information processing apparatus;

generating, at the first information processing apparatus, an application image including a result of execution of the application processing and showing the application image on the display of the first information processing apparatus;

directly transmitting, at the first information processing apparatus, the application image to the second information processing apparatus through the radio transceiver of the first information processing apparatus; and showing, at the second information processing apparatus, the application image from the first information processing apparatus on the display of the second information processing apparatus, wherein the application image, which is transmitted by the processing circuitry of the first information processing apparatus, is an integration of application images generated for respective second information processing apparatuses;

the processing circuitry of the second information processing apparatus shows, on the display of the second information processing apparatus, an image in a region corresponding to the second information processing apparatus, of the integrated application image; and the image in the region corresponding to the second information processing apparatus forms a partial image of the integrated application image.

23. An information processing apparatus capable of radio communication with another information processing apparatus, comprising:
a display;
a controller;
a radio transceiver; and
processing circuitry configured to:
perform application processing based on operation information accepted by the controller of the information processing apparatus and operation information from the another information processing apparatus;
generate an application image including a result of execution of the application processing and to show the application image on the display of the information processing apparatus; and
directly transmit the application image to the another information processing apparatus through the radio transceiver of the information processing apparatus for showing the application image on a display of the another information processing apparatus, wherein
the application image, which is transmitted by the processing circuitry of the information processing apparatus, is an integration of application images generated for respective other information processing apparatuses so that processing circuitry of the another information processing apparatus shows, on a display of the another information processing apparatus, an image in a region corresponding to the another information processing apparatus of the integrated application image; and the image in the region corresponding to the another information processing apparatus forms a partial image of the integrated application image.

24. A non-transitory storage medium encoded with a computer readable information processing program executed by an information processing apparatus capable of radio communication with another information processing apparatus, the information processing apparatus comprising a display, a controller, and a radio transceiver, the information processing program causing the information processing apparatus to perform the acts comprising:
performing application processing based on operation information accepted by the controller of the information processing apparatus and operation information from the another information processing apparatus;
generating an application image including a result of execution of the application processing and showing the application image on the display of the information processing apparatus; and
directly transmitting the application image to the another information processing apparatus through the radio transceiver of the information processing apparatus for showing the application image on a display of the another information processing apparatus, wherein
the application image, which is transmitted by the information processing apparatus, is an integration of application images generated for respective other information processing apparatuses so that the another information processing apparatus shows, on a display of the another information processing apparatus, an image in a region corresponding to the another information processing apparatus of the integrated application image; and the image in the region corresponding to the another information processing apparatus forms a partial image of the integrated application image.

25. An information processing method in an information processing apparatus capable of radio communication with another information processing apparatus, the information processing apparatus comprising a display, a controller, and a radio transceiver, the information processing method comprising:
performing application processing based on operation information accepted by the controller of the information processing apparatus and operation information from the another information processing apparatus;
generating an application image including a result of execution of the application processing and showing the application image on the display of the information processing apparatus; and
directly transmitting the application image to the another information processing apparatus through the radio transceiver of the information processing apparatus for showing the application image on a display of the another information processing apparatus, wherein
the application image, which is transmitted by the information processing apparatus, is an integration of application images generated for respective other information processing apparatuses so that the another information processing apparatus shows, on a display of the another information processing apparatus, an image in a region corresponding to the another information processing apparatus of the integrated application image; and the image in the region corresponding to the another information processing apparatus forms a partial image of the integrated application image.

26. The information processing system according to claim 1, wherein
the first information processing apparatus is configured to execute a game program, and
the second information processing apparatus is configured to execute a program different than the game program that is executed by the first information processing apparatus.

27. The information processing system according to claim 1, wherein
 the first information processing apparatus is configured to execute a game program, and
 the second information processing apparatus does not execute the game program executed by the first information processing apparatus.

* * * * *